United States Patent
Yanagi et al.

(10) Patent No.: US 7,951,854 B2
(45) Date of Patent: May 31, 2011

(54) INK COMPOSITION, INK SET AND INKJET RECORDING METHOD

(75) Inventors: Terukazu Yanagi, Ashigarakami-gun (JP); Akio Tamura, Ashigarakami-gun (JP); Takahiro Ishizuka, Ashigarakami-gun (JP); Takashi Hirakawa, Ashigarakami-gun (JP); Katsuyuki Hirato, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 538 days.

(21) Appl. No.: 12/132,792

(22) Filed: Jun. 4, 2008

(65) Prior Publication Data
US 2008/0305262 A1   Dec. 11, 2008

(51) Int. Cl.
*C09D 11/10* (2006.01)
(52) U.S. Cl. ............ 523/160; 523/161; 106/31.13; 347/100
(58) Field of Classification Search .......... 523/160, 523/161; 347/100; 106/31.13, 31.6; 524/556, 524/555
See application file for complete search history.

(56) References Cited

U.S. PATENT DOCUMENTS
2004/0244622 A1   12/2004   Ichinose et al.
2006/0057339 A1   3/2006   Adachi et al.

FOREIGN PATENT DOCUMENTS
JP   2003-082265 A   3/2003
JP   2004-115590 A   4/2004
JP   2004-338361 A   12/2004

OTHER PUBLICATIONS
EP Communication issued Nov. 6, 2008, in corresponding EP Application No. 08010263.5, 4 pages.

*Primary Examiner* — David Wu
*Assistant Examiner* — Vu A Nguyen
(74) *Attorney, Agent, or Firm* — Sughrue Mion, PLLC

(57) ABSTRACT

An ink composition includes: first particles which are insoluble and dispersed in an aqueous dispersion medium, a polarity of the first particles being one of positive and negative; and second particles which are insoluble and dispersed in the aqueous dispersion medium, the second particles including both a cationic group and an anionic group, the second particles having a zeta potential that changes along with a change in pH of the aqueous dispersion medium, percentage of a water-soluble component in the second particles being not higher than 5% by mass.

16 Claims, 10 Drawing Sheets

FIG. 5

TABLE 1

| | | ZETA POTENTIAL (mV) | | | AVERAGE PARTICLE SIZE (nm) |
|---|---|---|---|---|---|
| | | pH 4 | pH 5 | pH 8 | |
| 1 | DISPERSION LIQUID C1 | -4 | -17 | -42 | 98 |
| 2 | DISPERSION LIQUID C2 | -12 | -30 | -52 | 110 |
| 3 | DISPERSION LIQUID M1 | -13 | -30 | -60 | 76 |
| 4 | LATEX LX-07 | 37 | -9 | -59 | 35 |
| 6 | LATEX LX-07B | -4 | -34 | -59 | 35 |
| 7 | LATEX LX-07C | 40 | 0 | -42 | 35 |
| 8 | LATEX LX-H | -25 | -34 | -60 | 55 |

FIG. 6

TABLE 2

| | | PHYSICAL PROPERTIES AFTER LIQUID PREPERATION | | | |
|---|---|---|---|---|---|
| | | pH | SURFACE TENSION (mN/m) | VISCOSITY (mPa·s) | PARTICLE SIZE (nm) |
| 1 | INK C1-1 | 9.0 | 35.2 | 6.8 | 95 |
| 2 | INK C1-2 | 9.0 | 35.2 | 6.8 | 95 |
| 3 | INK C1-3 | 9.0 | 35.3 | 7.1 | 95 |
| 4 | INK C2-1 | 8.0 | 34.8 | 4.9 | 105 |
| 5 | INK M1-1 | 8.2 | 31.4 | 5.7 | 70 |
| 6 | INK C1-H | 8.8 | 32.5 | 7.9 | 88 |
| 7 | INK C2-H | 8.7 | 31.8 | 5.0 | 87 |
| 8 | INK M1-H | 9.1 | 31.9 | 5.2 | 60 |

FIG. 7

TABLE 3

| | | IMEDEATELY AFTER PREPERATION | | AFTER 14 DAYS AT 70°C | | REMARKS |
|---|---|---|---|---|---|---|
| | | VISCOSITY (mPa·s) | PARTICLE SIZE (nm) | VISCOSITY (mPa·s) | PARTICLE SIZE (nm) | |
| 1 | INK C1-1 | 6.8 | 95 | 7.0 | 96 | PRACTICAL EXAMPLE |
| 2 | INK C1-2 | 6.8 | 95 | 6.9 | 95 | PRACTICAL EXAMPLE |
| 4 | INK C2-1 | 4.9 | 105 | 5.0 | 105 | PRACTICAL EXAMPLE |
| 5 | INK M1-1 | 5.7 | 70 | 5.8 | 70 | PRACTICAL EXAMPLE |
| 6 | INK C1-H | 7.9 | 88 | 7.9 | 90 | COMPARATIVE EXAMPLE |
| 7 | INK C2-H | 5.0 | 87 | 5.1 | 87 | COMPARATIVE EXAMPLE |
| 8 | INK M1-H | 5.2 | 60 | 5.2 | 61 | COMPARATIVE EXAMPLE |

FIG. 8

TABLE 4

| | ELAPSED TIME FROM DROPLET EJECTION | | | | |
|---|---|---|---|---|---|
| | 15 SECONDS | 10 SECONDS | 2 SECONDS | 1 SECOND | |
| INK C1-1 | A | A | A | A | PRACTICAL EXAMPLE |
| INK C1-2 | A | A | B | B | PRACTICAL EXAMPLE |
| INK C1-3 | A | A | A | A | PRACTICAL EXAMPLE |
| INK C2-1 | A | A | A | A | PRACTICAL EXAMPLE |
| INK M1-1 | A | B | A | A | PRACTICAL EXAMPLE |
| INK C1-H | C | C | C | C | COMPARATIVE EXAMPLE |
| INK C2-H | A | B | C | C | COMPARATIVE EXAMPLE |
| INK M1-H | A | B | C | C | COMPARATIVE EXAMPLE |

FIG. 9

TABLE 5

| | PARTICLE SIZE (nm) | WATER-SOLUBLE COMPONENT (%) |
|---|---|---|
| A-01 | 25 | 2.9 |
| A-02 | 20 | 5.5 |
| A-03 | 22 | 4.9 |
| A-04 | 28 | 2.0 |

FIG. 10

TABLE 6

| INK | SELF-DISPERSING POLYMER | SURFACE TENSION (mN/m) | VISCOSITY (mPa·s) | EJECTION DISPLACEMENT | EJECTION EVALUATION | AGGREGATION CHARACTERISTICS |
|---|---|---|---|---|---|---|
| INK C1-11 | A-01 | 35.2 | 7.2 | 3.9 | A | A |
| INK C1-12 | A-02 | 35.4 | 7.0 | 21.0 | C | A |
| INK C1-13 | A-03 | 35.3 | 7.1 | 4.9 | B | A |
| INK C1-14 | A-04 | 35.4 | 7.2 | 3.0 | A | A |

INK COMPOSITION, INK SET AND INKJET RECORDING METHOD

BACKGROUND OF THE INVENTION

1. Field of the Invention

The present invention relates to an ink composition, an ink set and an inkjet recording method, and more particularly to technology for accelerating the aggregation reaction speed of an ink composition.

2. Description of the Related Art

An inkjet recording apparatus has been known which carries out recording by ejecting ink droplets respectively from a plurality of nozzles formed in an inkjet head. The inkjet recording apparatus has been widely used due to the low noise during recording, their low running costs, and their ability to record images of high quality on a wide variety of recording media.

Inkjet recording methods have been known which form an image temporarily on an intermediate transfer body by depositing ink droplets onto the intermediate transfer body from an inkjet head, and then transferring the image onto a recording medium. According to this transfer type of recording method, it is possible to remove the ink solvent (for example, water) on the intermediate transfer body by means of a solvent removal roller or other such device, before transferring the image onto the recording medium, and therefore problems, such as image bleeding, print-through, deformation of the recording medium (known as "cockling"), and the like, caused by the presence of the ink solvent, can be avoided, and a high-quality image can be obtained.

Furthermore, a two-liquid reaction method of the inkjet recording methods has been known which causes an ink to react with a treatment liquid for aggregating the ink. In this two-liquid reaction method, the fixing of the ink on the recording medium can be promoted by causing the ink to aggregate by means of the treatment liquid.

If the two-liquid reaction method is applied to a transfer type of inkjet recording method, then in order to achieve a compact size of the inkjet recording apparatus, it is necessary to shorten the time period from the time at which the ink makes contact with the treatment liquid on the intermediate transfer body until the ink aggregates. When the ink makes contact with the treatment liquid, the aggregate of the ink is produced by means of the aggregation reaction. The solvent in the aggregate is then removed when it is conveyed to the solvent removal roller. If the aggregate reaction speed is slow, then the distance from the droplet ejection nozzles until the solvent removal roller must be kept to a long distance, and consequently the inkjet recording apparatus becomes large in size.

Examples of the related art which uses a two-liquid reaction method in a transfer type of inkjet recording method are described in Japanese Patent Application Publication No. 2003-82265 and Japanese Patent Application Publication No. 2004-338361.

Japanese Patent Application Publication No. 2003-82265 describes a method which includes the steps of: mixing together, on a transfer body, a recording liquid containing at least a coloring material, and a treatment liquid containing a reactive component which reacts with at least one reactive component in the recording liquid; and transferring the combined material onto a recording medium. Moreover, it also describes using a recording liquid containing a resin emulsion having an ionic group on at least the surface of the resin particles, as a reactive component in the recording liquid which reacts with the reactive component in the treatment liquid. By this means, when recording at high speed, bleeding does not occur in the image on the transfer body, and a high transfer rate is obtained.

Furthermore, Japanese Patent Application Publication No. 2004-338361 describes using an ink set which includes: a treatment liquid containing particles whose dispersed state is maintained or broken down due to external factors; and a recording liquid containing a coloring material whose dispersed state or dissolved state is maintained or broken down due to external factors. By using this ink set, the dispersed state or the dissolved state of the treatment liquid and the recording liquid can be respectively broken down on the recording medium, and an image is thereby formed by means of the particles in the treatment liquid and the coloring material in the recording liquid aggregating without substantially mixing together. Therefore, it is possible substantially to suppress feathering and color bleeding on both an absorptive or a non-absorptive recording medium, and furthermore, a bright printed object which has high density and color saturation and which is faithful to the original document, can be obtained, as well as applying a luster to the printed object.

However, the ink compositions used in Japanese Patent Application Publication No. 2003-82265 and Japanese Patent Application Publication No. 2004-338361 have drawbacks in that an ink composition and a treatment liquid are ejected from respective nozzles, the aggregation reaction speed from contact on the intermediate transfer body until aggregation is slow, and a long time is required until the solvent can be removed by the solvent removal roller. Consequently, there is a problem in that the inkjet recording apparatus becomes large in size, and it becomes especially large in size in the case of an inkjet recording apparatus which requires fast recording.

Furthermore, if the two-liquid reaction method is used to aggregate directly on the recording medium, without using the intermediate transfer body, if the aggregation reaction speed between the ink composition and the treatment liquid is slow, then the coloring material permeates together with the solvent which permeates into the recording medium, the fixing characteristics on the recording medium deteriorate, and therefore the recording density and color definition decline. Consequently, accelerating the speed of the aggregating reaction between the ink composition and the treatment liquid is a serious issue in a normal inkjet recording method other than a transfer type of method.

SUMMARY OF THE INVENTION

The present invention has been contrived in view of these circumstances, an object thereof being to provide an ink composition and an ink set having an extremely fast aggregating reaction speed which is not achieved in the related art, as well as providing an inkjet recording method which uses this ink set.

In order to attain the aforementioned object, the present invention is directed to an ink composition including: first particles which are insoluble and dispersed in an aqueous dispersion medium, a polarity of the first particles being one of positive and negative; and second particles which are insoluble and dispersed in the aqueous dispersion medium, the second particles including both a cationic group and an anionic group, the second particles having a zeta potential that changes along with a change in pH of the aqueous dispersion medium, percentage of a water-soluble component in the second particles being not higher than 5% by mass.

In this aspect of the present invention, the ink composition includes: the first particles which are insoluble and dispersed in the aqueous dispersion medium, the first particles being charged to one of positive and negative polarities; and the second particles which are insoluble and dispersed in the aqueous dispersion medium, the second particles including both a cationic group and an anionic group, the second particles having a zeta potential that changes along with a change in pH of the aqueous dispersion medium. Therefore, it is possible to obtain an ink composition having a very fast aggregating reaction speed which cannot be achieved in the related art.

Hereinafter, the aqueous dispersion medium may be any liquid including water. In the present specification, the present invention is described with an example where the aqueous dispersion medium is water. Moreover, the first particles are also referred to as "water-insoluble particles A", and the second particles are also referred to as "water-insoluble particles B".

For example, if the pH of the aqueous dispersion medium is changed so that the zeta potential of the water-insoluble particles B changes and the polarity of the water-insoluble particles B becomes reversed with respect to the water-insoluble particles A which are charged positively or negatively, then the negative ions and the positive ions of the water-insoluble particles A and the water-insoluble particles B actively attract with each other and therefore the water-insoluble particles A and the water-insoluble particles B can be made to aggregate instantaneously. Moreover, even if the water-insoluble particles B do not reverse polarity but retain the same polarity as the water-insoluble particles A, since the zeta potential of the water-insoluble particles B changes and approaches zero, then it is possible to reduce the force of repulsion with respect to the water-insoluble particles A, and therefore the speed of the aggregating reaction can be accelerated in comparison with the related art.

Furthermore, it is important for the ink composition to include the water-insoluble particles A and the water-insoluble particles B together as in the present invention, from the viewpoint of accelerating the speed of the aggregating reaction. If the water-insoluble particles A and the water-insoluble particles B are respectively included in separate liquids, then it takes time for the liquid containing the water-insoluble particles A and the liquid containing the water-insoluble particles B to become mixed together after making contact with each other, resulting in the slow speed of the aggregating reaction.

Preferably, at least one of the first particles and the second particles includes a coloring material.

In this aspect of the present invention, at least one of the first particle (i.e., the water-insoluble particle A) and the second particle (i.e., the water-insoluble particle B) includes a coloring material. Moreover, the coloring material may be colorless. It is an essential feature of the present invention that the ink composition includes the first and second particles, but it may also include other additives apart from the first and second particles.

Preferably, the zeta potential of the second particles is within a range of −90 mV through 0 mV when the pH of the aqueous dispersion medium is 8; and the zeta potential of the second particles is within a range of 0 mV through 90 mV when the pH of the aqueous dispersion medium is 4.

In this aspect of the present invention, the second particles (i.e., the water-insoluble particles B) reverse polarity due to the change in the pH of the aqueous dispersion medium. This is because reversal in polarity of the second particles is more desirable from the viewpoint of accelerating the speed of the aggregating reaction.

Preferably, before the change in the pH of the aqueous dispersion medium, a polarity of the second particles is the same as the polarity of the first particles; and due to the change in the pH of the aqueous dispersion medium, the polarity of the second particles is inverted to be opposite to the polarity of the first particles.

In this aspect of the present invention, the second particles (i.e., the water-insoluble particles B) reverse polarity due to the change in the pH of the aqueous dispersion medium. It is preferable to satisfy the above polarity relationship between the first and second particles before and after the change in the pH of the aqueous dispersion medium, in view of the use in an inkjet recording apparatus which actually employs the ink composition. More specifically, the first and second particles are required to be kept in a dispersed state when the ink composition is stored in an ink accumulating chamber, for example, before being ejected as droplets from the nozzles of the inkjet head, in order to avoid the nozzle clogging during droplet ejection. On the other hand, after ejection of droplets onto the recording medium (or the intermediate transfer body), the first and second particles are required to aggregate rapidly.

Consequently, by charging the second particles (i.e., the water-insoluble particles B) to the same polarity as the first particles (i.e., the water-insoluble particles A) before the change in the pH environment as in the above-described aspect of the present invention, it is possible to form a satisfactory dispersed state in which the water-insoluble particles A and the water-insoluble particles B repulse each other. Furthermore, by changing the pH of the aqueous dispersion medium after droplet ejection, and thereby reversing the polarity of the water-insoluble particles B to the opposite polarity with respect to the polarity of the water-insoluble particles A, then it is possible to cause the water-insoluble particles A and the water-insoluble particles B to aggregate rapidly.

Preferably, a molar ratio of the anionic group to the cationic group in the second particles is within a range of 80:20 through 20:80.

In this aspect of the present invention, a molar ratio of the anionic group to the cationic group in the water-insoluble particles B is set within a preferable range in order to accelerate the speed of the aggregating reaction. If the molar ratio of the anionic group to the cationic group in the water-insoluble particles B is excessively high, then the charge of the water-insoluble particles A predominates and sufficient acceleration of the aggregating reaction is not achieved, even when the minor group (i.e., the cationic group) are reversed to the opposite polarity of the water-insoluble particles A. If, on the other hand, the molar ratio of the anionic group to the cationic group in the water-insoluble particles B is excessively low, then the charge of the water-insoluble particles A predominates and sufficient acceleration of the aggregating reaction is not achieved, even when the minor group (i.e., the anionic group) are reversed to the opposite polarity of the water-insoluble particles A.

Consequently, it is more desirable in terms of accelerating the speed of the aggregating reaction to set the molar ratio of the anionic group to the cationic group in the water-insoluble particles B in the range of 80:20 through 20:80. It is more desirable that the molar ratio of the anionic group to the cationic group is set in the range of 60:40 through 20:80 and even more desirably, the range of 50:50 through 30:70.

Preferably, the second particles are formed of a polymer that is constituted of a first repeating unit derived from a nonionic monomer, a second repeating unit derived from an anionic monomer and a third repeating unit derived from a cationic monomer, a molar ratio among the first to third repeating units being l:m:n.

Preferably, the second particles have surfaces coated with a polymer that is constituted of a first repeating unit derived from a nonionic monomer, a second repeating unit derived from an anionic monomer and a third repeating unit derived from a cationic monomer, a molar ratio among the first to third repeating units being l:m:n.

In these aspects of the present invention, the second particles themselves may be formed of a polymer that is constituted of a first repeating unit derived from a nonionic monomer, a second repeating unit derived from an anionic monomer and a third repeating unit derived from a cationic monomer, or only the surfaces of the second particles may be formed of a polymer that is constituted of a first repeating unit derived from a nonionic monomer, a second repeating unit derived from an anionic monomer and a third repeating unit derived from a cationic monomer.

Preferably, the second particles are formed of a self-dispersing polymer.

Preferably, the second particles are formed of a polymer which is synthesized in an organic solvent and dispersed in the aqueous dispersion medium that is water, the anionic group of the second particles being partially or wholly neutralized.

Preferably, the percentage of the water-soluble component in the second particles being not higher than 3% by mass.

Preferably, a difference between an average particle size of the first particles and an average particle size of the second particles is not less than 20 nm.

In this aspect of the present invention, a difference between an average particle size of the first particles and an average particle size of the second particles is set within a preferable range in order to accelerate the speed of the aggregating reaction. This is because, when the water-insoluble particles A and the water-insoluble particles B aggregate, the aggregation occurs more readily if the particle size difference between the two types of particles is equal to or greater than 20 nm. Moreover, the strength of the aggregated material created becomes stronger, and when the solvent is removed from the ink composition, the aggregated material is not liable to be damaged, even if pressurized with a solvent removal roller, for example.

Preferably, the first particles have an average particle size of 10 nm through 200 nm; and the second particles have an average particle size of 10 nm through 200 nm.

In this aspect of the present invention, the average particle size of the first particles and the average particle size of the second particles are set in a preferable range. It is more preferable to satisfy these conditions regarding the average particle size and the above-described conditions of the particle size difference between the first and the second particles.

In order to attain the aforementioned object, the present invention is also directed to an ink set comprising: the above-described ink composition; and a treatment liquid which causes the change in the pH of the aqueous dispersion medium In this aspect of the present invention, since the above-described ink composition is used, then the first and second particles aggregate rapidly when the ink composition is mixed with the treatment liquid.

In order to attain the aforementioned object, the present invention is also directed to an inkjet recording method comprising the steps of: applying the treatment liquid of the above-described ink set on a recording medium; and then applying the ink composition of the above-described ink set on the treatment liquid that has been applied on the recording medium, the treatment liquid on the recording medium mixing with the applied ink composition and causing the change in the pH of the aqueous dispersion medium, the first and second particles in the applied ink composition aggregating with each other due to the change in the pH of the aqueous dispersion medium.

This aspect of the present invention relates to an inkjet recording method in which the above-described ink composition and the above-described treatment liquid are directly applied on a recording medium and are mixed with each other. By using the above-described ink composition, it is possible to cause the first and second particles in the ink composition ejected as droplets onto the recording medium to aggregate rapidly. Therefore, the fixing characteristics of the aggregated material on the recording medium are improved, and the recording density and brightness of the image are enhanced.

Preferably, the above inkjet recording method further comprises the step of removing a solvent of the ink composition and the treatment liquid on the recording medium after the step of applying the ink composition.

In this aspect of the present invention, a solvent of the ink composition and the treatment liquid is removed after the step of applying the ink composition. Since the ink composition ejected as droplets onto the recording medium aggregates rapidly, then it is possible to shorten the time from droplet ejection until solvent removal, and compactification of the apparatus is also possible.

In order to attain the aforementioned object, the present invention is also directed to an inkjet recording method comprising the steps of: applying the treatment liquid of the above-described ink set on an intermediate transfer body; then applying the ink composition of the above-described ink set on the treatment liquid that has been applied on the intermediate transfer body, the treatment liquid on the intermediate transfer body mixing with the applied ink composition and causing the change in the pH of the aqueous dispersion medium, the first and second particles in the applied ink composition aggregating with each other due to the change in the pH of the aqueous dispersion medium so that an image is formed on the intermediate transfer body; then removing a solvent of the ink composition and the treatment liquid on the intermediate transfer body; and then transferring the image on the intermediate transfer body to a recording medium.

This aspect of the present invention relates to an inkjet recording method in which the above-described ink composition is firstly applied on the intermediate transfer body to mix with the treatment liquid that has been applied on the intermediate transfer body, resulting in the formation of an aggregate of the first and second particles in the ink composition. The aggregate is then transferred onto a recording medium. Since the above-described ink composition is used, then it is possible to cause the first and second particles in the inkjet ink droplets ejected onto the intermediate transfer body to aggregate rapidly. Therefore, the time from droplet ejection until solvent removal can be shortened and hence the apparatus can be made more compact in size.

As described above, according to the present invention, it is possible to provide an ink composition and an ink set having a very fast aggregating reaction speed, which is not possible in the related art. Consequently, by using an inkjet recording method which employs the ink set of the present invention, it is possible to make the recording apparatus more compact in size, and particularly beneficial effects are obtained in high-speed recording.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 5 is a diagram for describing the change in the zeta potential due to change in the pH environment of the dispersion liquid and the latex;

FIG. 6 is a diagram showing the measurement results of physical properties immediately after liquid preparation;

FIG. 7 is a diagram showing the measurement results of the viscosity and the particle size of the ink composition after 14 days;

FIG. 8 is a diagram for comparing the speed of the aggregating reaction of the inks according to an embodiment of the present invention, with that of inks in the related art;

FIG. 9 is a diagram showing the measurement results of the particle size and the amount of the water-soluble component for the self-dispersing polymers; and FIG. 10 is a diagram showing the evaluation results of the ejection direction characteristics.

BRIEF DESCRIPTION OF THE PREFERRED EMBODIMENTS

Figure 1:
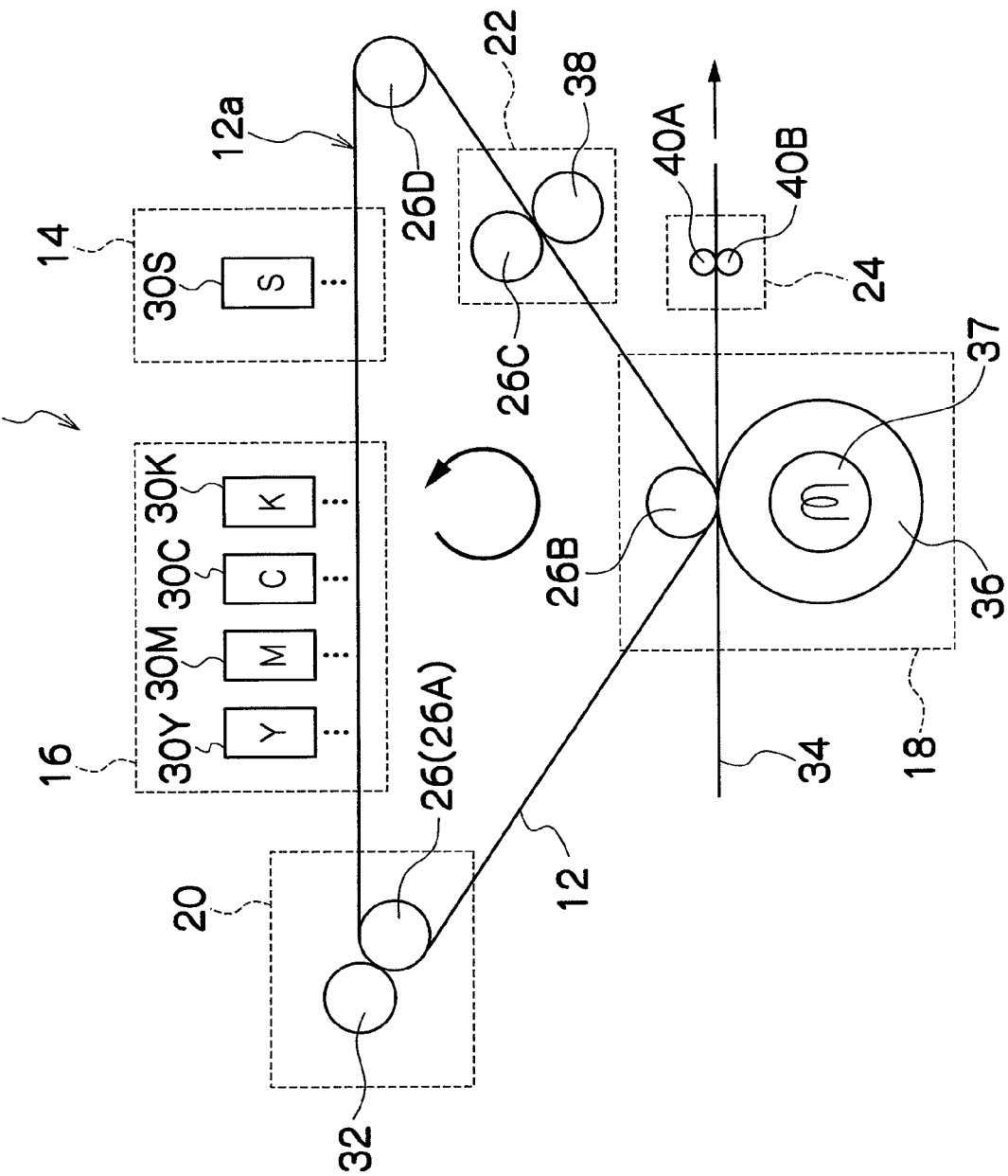
FIG. 1 is a general schematic diagram showing one example of an inkjet recording apparatus which implements the inkjet recording method according to an embodiment of the present invention.

An ink composition, an ink set and an inkjet recording method according to the present invention are described in the present specification.

Firstly, the ink composition of the present invention (hereinafter, referred to as "ink", simply) and the ink set of the present invention will be described.

Ink

The ink according to the present invention includes: an aqueous dispersion medium; water-insoluble particles A (corresponding to "first particles") which are insoluble and dispersed in the aqueous dispersion medium, a polarity of the first particles being one of positive and negative; and water-insoluble particles B (corresponding to "second particles") which are insoluble and dispersed in the aqueous dispersion medium, the second particles including both a cationic group and an anionic group, the second particles having a zeta potential that changes along with a change in pH of the aqueous dispersion medium, percentage of a water-soluble component in the water-insoluble particles B being not greater than 5% by mass. The aqueous dispersion medium may be water.

The zeta potential of the water-insoluble particles B is required to be changed in response to change in the pH environment (i.e., pH of the aqueous dispersion medium) as described above. It is desirable that due to the change in the pH of the aqueous dispersion medium of the ink, the polarity of the water-insoluble particles B is inverted to be opposite to the polarity (which is positive or negative) of the water-insoluble particles A. For example, the zeta potential of the water-insoluble particles B is –90 mV through 0 mV at pH 8, and the zeta potential of the water-insoluble particles B is 0 mV through 90 mV at pH 4.

Furthermore, desirably, before the change in the pH of the aqueous dispersion medium, the polarity of the water-insoluble particles B is the same as the polarity of the water-insoluble particles A, and due to the change in the pH of the aqueous dispersion medium of the ink, the polarity of the water-insoluble particles B is inverted to be opposite to the polarity (which is positive or negative) of the water-insoluble particles A. This is because the ink composition is required to be kept in a dispersed state when the ink composition is stored in an ink accumulating chamber, for example, before being ejected as droplets from the nozzles of the inkjet head, in order to avoid the nozzle clogging during droplet ejection. On the other hand, after ejection of droplets onto the recording medium (or the intermediate transfer body), the ink is required to aggregate rapidly.

Desirably, in the water-insoluble particles B, the molar ratio of the anionic group to the cationic group is desirably set in the range of 80:20 through 20:80, more desirably, in the range of 60:40 through 20:80, and particularly desirably, in the range of 50:50 through 30:70. If the molar ratio of the anionic group to the cationic group in the water-insoluble particles B is excessively high, then the charge of the water-insoluble particles A predominates and sufficient acceleration of the aggregating reaction is not achieved, even when the minor group (i.e., the cationic group) are reversed to the opposite polarity of the water-insoluble particles A. If, on the other hand, the molar ratio of the anionic group to the cationic group in the water-insoluble particles B is excessively low, then the charge of the water-insoluble particles A predominates and sufficient acceleration of the aggregating reaction is not achieved, even when the minor group (i.e., the anionic group) are reversed to the opposite polarity of the water-insoluble particles A.

In the water-insoluble particles B, the water-soluble component is contained. The percentage of the water-soluble component in the water-insoluble particles B is not higher than 5% by mass, and desirably not higher than 3% by mass. In cases where the content of water-soluble component in the water-insoluble particles B exceeds 5% by mass, then if the ink composition is ejected by an inkjet method, the ejection characteristics, for example, the ejection direction characteristics, decline.

The water-soluble component is a compound which is contained in a resin forming the water-insoluble particles B and which dissolves in water when the resin is dispersed in a continuous phase (i.e., dispersion medium) of water. The water-soluble component is, for example, a water-soluble compound which is generated as a by-product material or becomes intermixed when manufacturing the resin.

The coloring material in the ink is included in at least one of the water-insoluble particles A and the water-insoluble particles B, and the present embodiment is described with reference to an example in which the water-insoluble particles A are particles including an organic pigment (coloring material) and a dispersant which causes the organic pigment to be dispersed, and the water-insoluble particles B are polymer latex particles.

Although the present embodiment is described with reference to an example in which the water-insoluble particles A include the organic pigment and the dispersant, and the water-insoluble particles B are the polymer latex particles, the present invention is not limited to this example. For example, the water-insoluble particles B may include the organic pigment and the dispersant, and the water-insoluble particles A may be the polymer latex particles. In this case, it is preferable to use a compound having both cationic group and anionic group as the dispersant, and to use a positively or negatively charged compound as the polymer latex.

Moreover, the ink viscosity is desirably within a range of 1 mPa·s through 30 mPa·s, more desirably, in a range of 1 mPa·s through 20 mPa·s, even more desirably, in the range of 2 mPa·s through 15 mPa·s, and particularly desirably, in the range of 2 mPa·s through 10 mPa·s.

<<Water-Insoluble Particles A>>
(Organic Pigment)

The ink usable in the present embodiment can be used for full-color image formation, as well as for monochrome image formation. In order to form a full-color image, it is possible to use a magenta-toned ink, a cyan-toned ink and a yellow-toned ink. A black-toned ink may also be used in order to adjust the color tones. Furthermore, besides the yellow, magenta and cyan-toned inks, it is also possible to use red, green, blue or white inks, or so-called special colored inks (for example, colorless inks) used in the field of printing.

Specific examples of organic pigments used in the present embodiment are described below.

Examples of an orange or a yellow organic pigment include, for example: C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128, C. I. Pigment Yellow 138, C. I. Pigment Yellow 151, C. I. Pigment Yellow 155, C. I. Pigment Yellow 180, C.I. Pigment Yellow 185, or the like.

Specific examples of a red or magenta organic pigment are, for instance: C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178, C. I. Pigment Red 222, C.I. Pigment Violet 19, or the like.

Specific examples of a green or cyan organic pigment are, for instance: C. I. Pigment Blue 15, C. I. Pigment Blue 15:2, C. I. Pigment Blue 15:3, C. I. Pigment Blue 15:4, C. I. Pigment Blue 16, C. I. Pigment Blue 60, C. I. Pigment Green 7, a siloxane-crosslinked aluminum phthalocyanine as described in U.S. Pat. No. 4,311,775, or the like.

Specific examples of a black organic pigment are: C. I. Pigment Black 1, C. I. Pigment Black 6, C.I. Pigment Black 7, or the like.

Furthermore, in terms of the average particle size of the organic pigment, the smaller the particle size, the better from the perspective of transparency and color reproduction, and on the other hand, the larger the particle size, the better from the perspective of lightfastness. The average particle size which meets both these conditions is desirably, 10 nm through 200 nm, more desirably, 10 nm through 150 nm, and even more desirably, 10 nm through 100 nm. Furthermore, there are no particular restrictions on the particle size distribution of the organic pigment particles and they may have a broad particle size distribution or they may have a monodisperse particle size distribution. Moreover, it is also possible to use a mixture of two or more types of organic pigment having a monodisperse particle size distribution.

Furthermore, the added content of the organic pigment is desirably, 1 wt % through 25 wt %, more desirably, 2 wt % through 20 wt %, even more desirably, 5 wt % through 20 wt %, and particularly desirably, 5 wt % through 15 wt %, with respect to the ink.

(Dispersant)

The dispersant of the organic pigment used in the present embodiment may be a polymer dispersant or a low-molecular-weight surfactant type of dispersant. Furthermore, the polymer dispersant may be a water-soluble dispersant or it may be a water-insoluble dispersant.

The low-molecular-weight surfactant-type dispersant usable in the present embodiment is added with the object of causing the organic pigment to disperse stably in the aqueous solvent, while keeping the viscosity of the ink low. The low-molecular-weight dispersant usable in the present embodiment is a low-molecular-weight dispersant having a molecular weight of 2000 or less. Furthermore, the molecular weight of the low-molecular-weight dispersant is desirably 100 through 2000, and more desirably, 200 through 2000.

In the present embodiment, the low-molecular-weight dispersant includes a hydrophilic group and a hydrophobic group. Moreover, at least one hydrophilic group and at least one hydrophobic group may be included in one molecule of the low-molecular-weight dispersant. Furthermore, hydrophilic groups and hydrophobic groups of a plurality of different types may be included in the one molecule of the low-molecular-weight dispersant. The low-molecular-weight dispersant may include a linking group in order to link the hydrophilic group and the hydrophobic group, if required.

The hydrophilic group is anionic, cationic, nonionic, or a betaine combining these, or the like.

The anionic group may be any group having a negative electric charge, and desirably, it is a phosphoric acid group, a phosphonic acid group, a phosphinic acid group, a sulfuric acid group, a sulfonic acid group, a sulfinic acid group or a carboxylic acid group, and more desirably, it is a phosphoric acid group or a carboxylic acid group, and even more desirably, it is a carboxylic acid group.

The cationic group may be any group having a positive charge, and desirably it is an organic cationic substituent group, and more desirably, it is a cationic group of nitrogen or phosphorous. Moreover, even more desirably, the cationic group is a pyrridium cation or an ammonium cation.

The non-ionic group may be polyethylene oxide, or polyglycerine, or a portion of a sugar unit, or the like.

In the present embodiment, the hydrophilic group is desirably an anionic group. The anionic group is desirably a phosphoric acid group, a phosphonic acid group, a phosphinic acid group, a sulfuric acid group, a sulfonic acid group, a sulfinic acid group or a carboxylic acid group, and more desirably, it is a phosphoric acid group or a carboxylic acid group, and even more desirably, it is a carboxylic acid group.

Furthermore, if the low-molecular-weight dispersant has an anionic hydrophilic group, then it is desirable that the pKa is 3 or above, from the viewpoint of accelerating the aggregating reaction by making contact with the acidic treatment liquid. The pKa of the low-molecular-weight dispersant according to the present invention can be found experimentally from a titration curve obtained by titration with an aqueous acidic or alkaline solution of a liquid obtained by dissolving the low-molecular weight dispersant at 1 mmol/L in a tetrahydrofuran-water solution (3:2=V/V). If the pKa value of the low-molecular-weight dispersant is 3 or above, then theoretically, when the dispersant makes contact with a treatment liquid which has a pH or around 3, 50% or more of the anionic group assumes an non-dissociated state. Consequently, the water solubility of the low-molecular-weight dispersant declines markedly and an aggregating reaction occurs. In other words, the aggregation reactivity increases. From this perspective, the low-molecular-weight dispersant desirably has a carboxylic acid group as the anionic group.

The hydrophobic group may have a structure of a hydrocarbon type, a fluorocarbon type or a silicone type, for example, and the hydrocarbon type is desirable. Furthermore, the hydrophobic group may have either a straight chain structure or a branched structure. Moreover, the hydrophobic group may be one straight chain structure or a greater number of straight chain structures, and if it is two or more straight chain structures, then it may be constituted of a plurality of different types of hydrophobic groups.

Furthermore, the hydrophobic group is desirably a hydrocarbon group having 2 to 24 carbon atoms, more desirably, a hydrocarbon group having 4 to 24 carbon atoms, and even more desirably, a hydrocarbon group having 6 to 20 carbon atoms.

Among polymer dispersants, a hydrophilic high-molecular compound can be used as a water-soluble dispersant, and for example, in the case of a natural hydrophilic high-molecular compound, it is possible to use a plant-based polymer, such as gum Arabic, gum tragacanth, gua gum, karaya gum, locust bean gum, arabinogalacton, pectin, quince seed starch, or the like, or a seaweed-based polymer, such as alginic acid, carrageenan, agar, or the like, or an animal-based polymer, such as gelatin, casein, albumin, collagen, or the like, or a microorganism-based polymer, such as xanthane gum, dextran, and the like.

As a hydrophilic polymer compound which has been modified from a natural raw material, it is possible to use: a fiber-based polymer, such as methyl cellulose, ethyl cellulose, hydroxyethyl cellulose, hydroxpropyl cellulose, carboxymethyl cellulose, or the like, a starch-based polymer, such as sodium starch glycolate, sodium starch phosphate ester, or the like, or a seaweed-based polymer, such as sodium alginate, propyleneglycol alginate ester, or the like.

Furthermore, as a synthetic water-soluble polymer compound, it is possible to use a vinyl-based polymer, such as polyvinyl alcohol, polyvinyl pyrrolidone, polyvinyl methyl ether, or the like, an acryl-based resin, such as a non-crosslinked polyacrylamide, polyacrylic acid or an alkali metal salt thereof, water-soluble styrene-acryl resin, or the like; water-soluble styrene maleic acid resin; water-soluble vinyl naphthalene acryl resin; water-soluble vinyl naphthalene maleic acid resin; polyvinyl pyrrolidone, polyvinyl alcohol, an alkali metal salt of a β-naphthalene sulfonic acid formaldehyde condensate; a polymer compound with side chains having cationic functional groups, such as quaternary ammonium, an amino group, or the like; or a natural polymer compound such as shellac.

Of these, it is particularly desirable to use a homopolymer, such as acrylic acid, methacrylic acid, or styrene acrylic acid, for the polymer dispersant. Moreover, it is possible to use a polymer of monomer having another hydrophilic group into which a carboxylic group is incorporated.

Of the polymer dispersants, as a water-insoluble dispersant, it is possible to use a polymer having both a hydrophobic part and a hydrophilic part, and possible examples include: a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, a vinyl acetate-maleic acid copolymer, a styrene-maleic acid copolymer, or the like.

Desirably, the average molecular weight of the dispersant is 3,000 through 100,000, and more desirably, 5,000 through 50,000, even more desirably, 5,000 through 40,000, and particularly desirably, 10,000 through 40,000.

The mixture mass ratio of the organic pigment to the dispersant is desirably in the range of 1:0.06 through 1:3, more desirably, in the range of 1:0.125 through 1:2, and even more desirably, 1:0.125 through 1:1.5.

<<Water-Insoluble Particles B>>

The water-insoluble particles B is preferably formed of a polymer that is constituted of a first repeating unit derived from a nonionic monomer, a second repeating unit derived from an anionic monomer and a third repeating unit derived from a cationic monomer, a molar ratio among the first to third repeating units being l:m:n. In other words, the polymer forming the water-insoluble particles B can be represented as follows:

$$(C)l\text{-}(D)m\text{-}(E)n \qquad (1).$$

General formula (1) represents a polymer compound which is obtained through the polymerization of at least a nonionic monomer "C", an anionic monomer "D" and a cationic monomer "E". In other words, the polymer represented by the general formula (1) includes at least three types of repeating units (i.e., a nonionic unit "C", an anionic unit "D" and a cationic unit "E"). In the general formula (1), l, m and n represent the degrees of polymerization for the monomers (repeating units) C, D and E, respectively.

The term "nonionic monomer" means a monomer compound which does not have a dissociative functional group. In this case, the term "monomer compound" means, in broad terms, a compound that can be homo-polymerized and a compound that can be co-polymerized. Desirably, the monomer compound is a monomer compound having an unsaturated double bond.

Examples of the nonionic monomer include: an aromatic vinyl compound, an acrylic acid ester-amide compound, a methacrylic acid ester-amide compound, a vinyl ester compound, a vinyl cyanide compound, an olefin compound, a diene compound, or the like.

Concrete examples of the aromatic vinyl monomers include: styrene, 2-methyl styrene, vinyl toluene, t-butyl styrene, chlorostyrene, vinyl anisole, vinyl naphthalene, and the like.

Examples of the acrylic acid ester include: methyl acrylate, ethyl acrylate, isopropyl acrylate, n-butyl acrylate, isobutyl acrylate, n-amyl acrylate, isoamyl acrylate, n-hexyl acrylate, 2-ethyl hexyl acrylate, octyl acrylate, decyl acrylate, dodecyl acrylate, octadecyl acrylate, cyclohexyl acrylate, phenyl acrylate, benzyl acrylate, glycidyl acrylate, and the like.

Examples of the acrylic acid amide compound include: acryl amide, N,N-dimethyl aminopropyl acryl amide, N,N-dimethyl acryl amide, acryloyl morpholin, N-isopropyl acryl amide, N,N-diethyl acrylamide, or the like.

Examples of the methacrylic acid ester include: methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidil methacrylate, or the like.

One example of the vinyl ester is vinyl acetate, and examples of the vinyl cyanide compound are acrylonitrile, methacrylonitrile, and the like.

Possible examples of the halogenated monomer include vinylidene chloride, vinyl chloride, and the like, and examples of an olefin include ethylene, propylene, and isopropylene.

Examples of the diene are butadiene, isoprene, chloroprene, and the like, and examples of a vinyl monomer are vinyl ether, vinyl ketone, vinyl pyrrolidone, and the like.

The anionic monomer is a monomer compound which includes an anionic group that may take a negative charge, and the anionic group may be any anionic group which has a negative charge. Preferably, the anionic group is a phosphoric acid group, a phosphonic acid group, a phosphinic acid group, a sulfuric acid group, a sulfonic acid group, a sulfinic acid group or a carboxylic acid group, and more desirably, it is a phosphoric acid group or a carboxylic acid group, and even more desirably, it is a carboxylic acid group.

The anionic monomer may be a monomer having an anionic group as a nonionic monomer substituent, as described above, or a monomer containing carboxylic acid (for example, acrylic acid, methacrylic acid, itaconic acid, fumaric acid, maleic acid, or the like), and desirably, it is a monomer containing carboxylic acid, and even more desirably, it is acrylic acid or methacrylic acid.

A cationic monomer refers to a monomer which contains a cationic group that may take a positive electric charge, and the cationic group may be any group having a positive charge. Desirably, it is an organic cationic substituent, and more desirably, it is a cationic group of nitrogen or phosphorous. Moreover, even more desirably, the cationic group is a pyrridium cation or an ammonium cation.

The cationic monomer may be a monomer having a cationic group as a substituent of the nonionic monomer described above, or it may be a monomer containing pyrridium cations or ammonium cations; desirably, it is a monomer containing ammonium cations, and more desirably, it is N,N-dimethyl aminoethyl acrylate, N,N-dimethyl aminoethyl methacrylate, vinyl imidazole, or the like.

Below, LX-01 to LX-18 are given as specific examples of the compound of the water-insoluble particles B having the general formula (1) stated above.

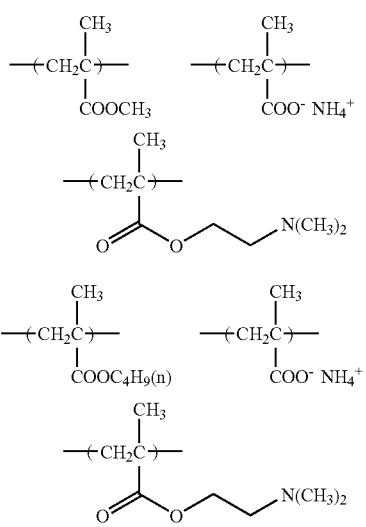

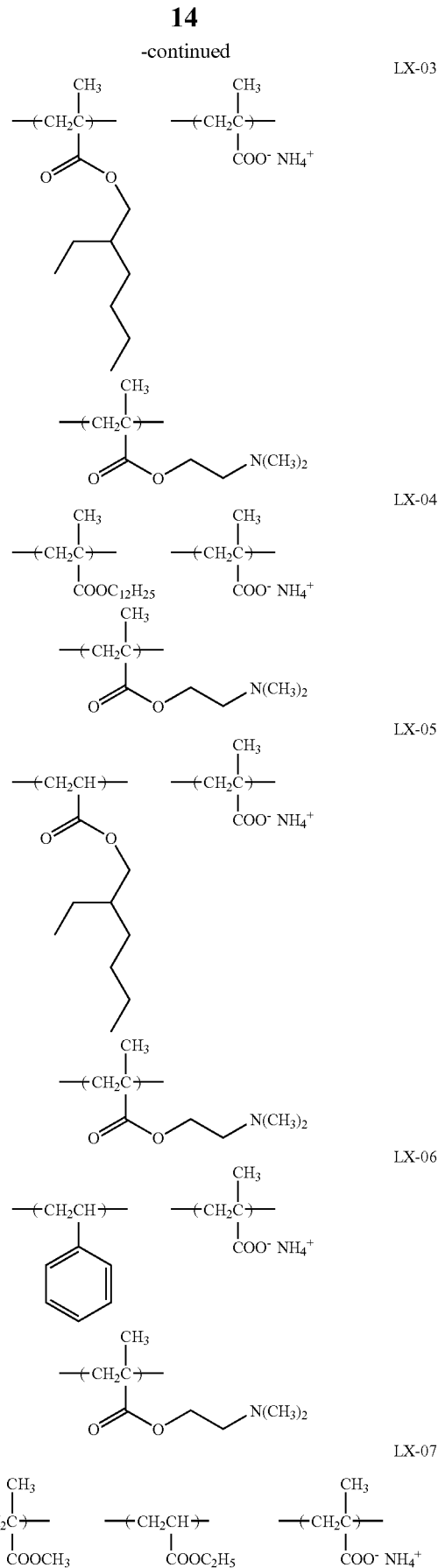

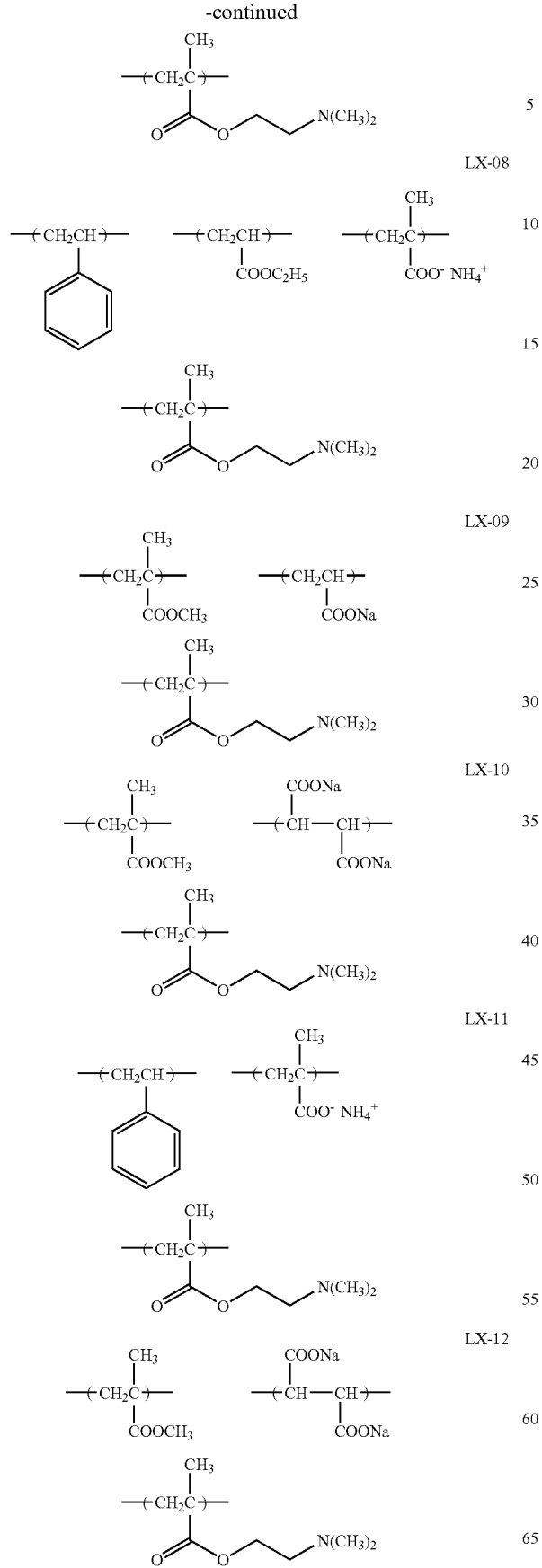
Examples of the monomer composition ratio (mass ratio) in LX-01 to LX-18 are described below.
LX-01 90:7:3, LX-02 90:7:3, LX-03 91:6:3, LX-04 85:5:2, LX-05 90:7:3, LX-06 85:10:5, LX-07 45:45:7:3, LX-08

10:80:7:3, LX-09 90:7:3, LX-10 94:3:3, LX-11 90:10:5, LX-12 90:7:3, LX-13 90:7:3, LX-14 90:7:3, LX-15 90:7:3, LX-16 90:7:3, LX-17 90:7:3, LX-18 90:7:3

The range of the molecular weight of the polymer compound which constitutes the water-insoluble particles B is desirably between 3000 and 200,000, more desirably, between 5000 and 150,000, and most desirably, between 10,000 to 100,000, in terms of the weight-average molecular weight. If the weight-average molecular weight is 3000 or above, then it is possible effectively to suppress the amount of the water-soluble component. Furthermore, by setting the weight-average molecular weight to 200,000 or less, it is possible to increase the self-dispersion stability.

The weight-average molecular weight can be measured by gel permeation chromatography (GPC).

From the viewpoint of the ink aggregating properties and ejection characteristics, the water-insoluble particles B according to the present invention are desirably self-dispersing polymer particles. The self-dispersing polymer usable in the present invention is a water-insoluble polymer which, in the absence of a surfactant, assumes a dispersed state in an aqueous medium, due to the functional groups of the polymer itself (and in particular, the cationic groups, anionic groups or salts of these). Here, a dispersed state includes both an emulsified state (emulsion) where water-insoluble polymer in a liquid state is dispersed in an aqueous medium, and a dispersed state (suspension) where water-insoluble polymer in a solid state is dispersed in an aqueous medium.

With regard to the self-dispersing polymer, for example, from the viewpoint of the ink fixing characteristics when the polymer is included in the ink composition, it is desirable that the self-dispersing polymer should be capable of assuming a dispersed state in which the water-insoluble polymer in a solid state is dispersed.

As a method of preparing the self-dispersing polymer in the emulsified or dispersed state, in other words, the aqueous dispersion of self-dispersing polymer, for example, the following method can be used. After dissolving or dispersing the self-dispersing polymer in a solvent (for example, in a water-soluble organic solvent, or the like), it is introduced directly into water without adding a surfactant. Then, in a state where the salt-generating groups (for example, the anionic groups) belonging to the self-dispersing polymer are neutralized, the mixture is agitated and mixed, and the solvent is removed, to yield an aqueous dispersion forming an emulsified or a dispersed state.

In this case, the emulsified or dispersed state of the self-dispersing polymer is a state where the emulsified or dispersed state remains stable for at least one week at 25° C., after a solution obtained by dissolving 30 g of water-insoluble polymer in 70 g of organic solvent (for example, methylethyl ketone) is mixed with a neutralizer which can completely neutralize of the salt-generating group of the water-insoluble polymer (if the salt-generating group is an anionic group, then sodium hydroxide, and if it is a cationic group, then acetic acid, or the like), together with 200 g of water, agitation is carried out (using an agitation apparatus with agitating blades at a rotational speed of 200 rpm, for 30 minutes and at a temperature of 25° C.), and the organic solvent is then removed from the liquid mixture.

Furthermore, a water-insoluble polymer is a polymer which has a dissolved amount of 10 g or less, desirably, 5 g or less, and more desirably, 1 g or less, when the polymer is dried for 2 hours at 105° C. and then dissolved in 100 g of water at 25° C. In this case, the dissolved amount is the amount of polymer which is dissolved when completely neutralized with sodium hydroxide or acetic acid, in accordance with the type of the salt-generating group in the water-insoluble polymer.

There are no particular restrictions on the method of manufacturing the polymer compound which constitutes the water-insoluble particles B, and it is possible to manufacture the polymer compound by copolymerization of a monomer mixture, by means of a commonly known polymerization method, such as mass polymerization, solution polymerization, or the like. Of these polymerization methods, solution polymerization is desirable from the viewpoint of droplet ejection stability when formed into an ink composition.

In the method of manufacture described above, the polymer compound can be manufactured by means of a copolymerization reaction of a mixture of a monomer compound, an organic solvent, and a radical polymerization initiator, in an inert gas atmosphere.

From the viewpoint of the aggregating characteristics and ink ejection properties, desirably, the water-insoluble particles B in the present invention are made of a polymer which is synthesized in an organic solution and dispersed in a dispersion medium (also referred to as "continuous phase") that is water. Moreover, it is preferable that all or a portion of the anionic groups are neutralized (i.e., the anionic groups are partially or wholly neutralized). More desirably, the anionic groups are carboxyl groups.

The method of preparing the polymer dispersion desirably includes step (1) and step (2) below.

Step (1): A step of agitating a mixture containing a water-insoluble polymer, an organic solvent, a neutralizer, and an aqueous medium.

Step (2): A step of removing the organic solvent from the mixture obtained in the step (1).

Desirably, the step (1) is a process in which the water-insoluble polymer is firstly dissolved in an organic solvent, and a neutralizing agent and an aqueous medium are gradually added and mixed and agitated, thereby obtaining a dispersion. In this way, by adding the neutralizing agent and the aqueous medium to the water-insoluble polymer dissolved in an organic solvent, it is possible to obtain water-insoluble particles B having higher storage stability in terms of the particle size, without having to apply a strong shearing force.

There are no particular restrictions on the method of agitating the mixture, and it is possible to use a generally-used mixing and agitating apparatus, or according to requirements, a dispersion apparatus, such as an ultrasonic disperser, a high-voltage homogenizer, or the like.

Desirable examples of organic solvents are: an alcohol-based solvent, a ketone-based solvent, and an ether-based solvent.

The alcohol-based solvent may be: isopropyl alcohol, n-butanol, t-butanol, ethanol, or the like. The ketone-based solvent may be: acetone, methylethyl ketone, diethyl ketone, methyl isobutyl ketone, or the like. The ether-based solvent may be: dibutyl ether, dioxane, and the like. Of these solvents, a ketone-based solvent such as methyl ethyl ketone, and an alcohol-based solvent such as isopropyl alcohol, are desirable. Furthermore, with the object of alleviating the change in polarity during the phase transfer from an oil phase to an aqueous phase, it is desirable to combine the use of isopropyl alcohol and methyl ethyl ketone. By combing the use of these solvents, it is possible to obtain water-insoluble particles B having a fine particle size of high dispersion stability, without the occurrence of any aggregation or sedimentation, or fusion between particles.

The neutralizing agent is used to neutralize all or a portion of the dissociable groups (i.e., the anionic groups and cationic groups), in order to create a stable emulsified or dispersed state of the self-dispersing polymer in water. If the self-dispersing polymer according to the present invention has an anionic dissociable group as the dissociable group, then possible examples of the material used as the neutralizing agent are a basic compound, such as an organic amine compound, ammonia, a hydroxide of an alkali metal, or the like. Possible examples of an organic amine compound are: monomethyl amine, dimethyl amine, trimethyl amine, monoethyl amine, diethyl amine, triethyl amine, monopropyl amine, dipropyl amine, monoethanol amine, diethanol amine, triethanol amine, N,N-dimethyl-ethanol amine, N,N-diethyl-ethanol amine, 2-dimethylamino-2-methyl-1-propanol, 2-amino-2-methyl-1-propanol, N-methyl diethanol amine, N-ethyl diethanol amine, mono isopropanol amine, di-isopropanol amine, tri-isopropanol amine, or the like. Possible examples of a hydroxide of an alkali metal are: lithium hydroxide, sodium hydroxide, potassium hydroxide, or the like. Of these, from the viewpoint of the dispersion stability of the self-dispersing polymer particles of the present invention in water, desirable examples are: sodium hydroxide, potassium hydroxide, triethyl amine, and triethanol amine.

Desirably, the basic compound is used at a ratio of 5 to 120 mol %, more desirably, 10 to 110 mol %, and even more desirably, 15 to 100 mol %, with respect to 100 mol % of the dissociable group. If the amount of the basic compound is 15 mol % or above, then a beneficial effect is obtained in stabilizing the dispersion of the particles in water, and if the amount is 100 mol % or less, then a beneficial effect is obtained in reducing the water-soluble component.

In step (2) described above, the dispersion obtained in step (1) is taken and an aqueous dispersion of the water-insoluble particles B (a polymer dispersion in which a polymer is dispersed in a continuous phase of water) can be obtained by removing the organic solvent by means of a common method, such as vacuum evaporation, and thus changing the dispersion to a water phase. The organic solvent in the aqueous dispersion thus obtained is effectively removed, and the amount of organic solvent is desirably not higher than 0.2% by mass, and more desirably, not higher than 0.1% by mass.

Desirably, from the viewpoint of the ink aggregating properties, the water-insoluble particles B are contained in the ink composition according to the present invention at a ratio of 0.5% by mass through 20% by mass with respect to the ink composition, more desirably, 1.0% by mass through 16% by mass, and particularly desirably, 4.0% by mass through 10% by mass.

<<Particle Sizes of Water-Insoluble Particles A and Water-Insoluble Particles B>>

Desirably, the difference between the average particle size of the water-insoluble particles A and the average particle size of the water-insoluble particles B is 20 nm or greater, and more desirably, 30 nm or greater, and especially desirably, 40 nm or greater.

This is because when the water-insoluble particles A and the water-insoluble particles B aggregate, this aggregation is more liable to occur when the difference in particle size between the two types of particles is equal to or greater than 20 nm, and furthermore, the formed aggregate has greater strength, and the aggregate is not liable to be damaged even when pressed with a solvent absorbing roller in the step of removing the excess solvent from the ink composition, for example.

In this case, desirably, the average particle size of the water-insoluble particles A is in the range of 10 nm through 200 nm, and the average particle size of the water-insoluble particles B is in the range of 10 nm through 200 nm.

If the water-insoluble particles A are constituted by an organic pigment and a dispersant, and the water-insoluble particles B are made of latex, as in the present embodiment, then it is desirable that the water-insoluble particles B, in other words, the latex, preferably have a smaller average particle size than the water-insoluble particles A.

<<Water-Soluble Organic Solvent>>

The water-soluble organic solvent usable in the present embodiment may be added in the ink composition from in order to prevent drying and promoting wetting, and the like. Furthermore, preferably, an anti-drying agent is used at the ink spraying ports of the nozzles in an inkjet recording system, and it prevents blockages caused by drying of the inkjet ink.

Desirably, the anti-drying agent is a water-soluble organic solvent having a lower vapor pressure than water. Specific examples of an anti-drying agent include: a polyvalent alcohol typified by ethylene glycol, propylene glycol, diethylene glycol, polyethylene glycol, thiodiglycol, dithioglycol, 2-methyl-1,3-propane diol, 1,2,6-hexane triol, an acetylene glycol derivative, glycerine, trimethylol propane, or the like; a lower alkyl ether of a polyvalent alcohol, such as an ethylene glycol monomethyl (or ethyl)ether, a diethylene glycol monomethyl (or ethyl)ether, or a triethylene glycol monomethyl (or ethyl) ether; a heterocyclic ring, such as 2-pyrrolidone, N-methyl-2-pyrrolidone, 1,3-dimethyl-2-imidazolidinone, or N-ethyl morpholin, or the like; a sulfurous compound, such as sulfolane, dimethyl sulfoxide, 3-sulfolene, or the like, a polyfunctional compound, such as diacetone alcohol, diethanol amine, or the like; or a urea derivative. Of these, desirably, the anti-drying agent is a polyhydric alcohol, such as glycerine or diethylene glycol. Furthermore, the anti-drying agents described above may be used independently, or two or more types of anti-drying agent may be used together in combination. Desirably, the content of these anti-drying agents in the ink is 10 to 50 wt %.

Furthermore, preferably, a permeation promoter is used in order to make the ink permeate more readily into the recording medium (printing paper). Specific examples of a permeation promoter which can be used preferably in the present invention are: an alcohol, such as ethanol, isopropanol, butanol, di(tri)ethylene glycol monobutyl ether, 1,2-hexanediol, or the like, or sodium lauryl sulfate, sodium oleate, a non-ionic surface active agent, or the like. These permeation promoters display sufficient effects when contained at a rate of 5 wt % through 30 wt % in the ink composition. Moreover, the permeation promoter is desirably used within an added volume range which does not produce bleeding during printing, or print through.

Furthermore, in addition to the foregoing, the water-soluble organic solvent is also used to adjust the viscosity. Specific examples of a water-soluble organic solvent which can be used to adjust the viscosity include: alcohols (for example, methanol, ethanol, propanol, isopropanol, butanol, isobutanol, sec-butanol, t-butanol, pentanol, hexanol, cyclohexanol, and benzyl alcohol,) polyvalent alcohols (for example, ethylene glycol, diethylene glycol, triethylene glycol, polyethylene glycol, propylene glycol, dipropylene glycol, polypropylene glycol, butylene glycol, hexane diol, pentane diol, glycerine, hexane triol, or thiodiglycol,) glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, or ethylene glycol monophenyl ether), amines (for example, ethanol amine, diethanol amine, triethanol amine, N-methyl diethanol amine, N-ethyl diethanol amine, morpholin, N-ethyl morpholin, ethylene diamine, diethylene triamine, triethylene tetramine, polyethylene imine, or tetramethyl propylene diamine) and other polar solvents (for example, formamide, N,N-dimethyl formamide, N,N-dimethyl acetoamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, or acetone). The water-soluble organic solvent may be used independently, or a combination of two or more types thereof may be used.

<<Other Additives>>

Other additives which can be used in the present embodiment are, for example, an anti-drying agent (humidifier), an anti-fading agent, an emulsion stabilizer, a permeation promoting agent, an ultraviolet absorber, a preservative, an antibacterial agent, a pH adjuster, a surface tension adjuster, an antifoaming agent, a viscosity adjuster, a dispersant, a dispersion stabilizer, an anti-rusting agent, a chelating agent, or the like. In the case of an aqueous ink, these various additives are added directly to the ink. In a case where an oil-soluble pigment is used in the form of a dispersion, additives are generally added to the pigment dispersion after preparation of the dispersion: however, additives may be added into the oil phase or the water phase during the preparation of the dispersion.

An ultraviolet absorber is used in order to improve image conservation. For the ultraviolet absorber, it is possible to use a; benzotriazole compound as described in Japanese Patent Application Publication No. 58-185677, Japanese Patent Application Publication No. 61-190537, Japanese Patent Application Publication No. 2-782, Japanese Patent Application Publication No. 5-197075, Japanese Patent Application Publication No. 9-34057, or the like; a benzophenone compound as described in Japanese Patent Application Publication No. 46-2784, Japanese Patent Application Publication No. 5-194483, U.S. Pat. No. 3,214,463, or the like; a cinnamic acid compound as described in Japanese Patent Application Publication No. 48-30492, Japanese Patent Application Publication No. 56-21141, Japanese Patent Application Publication No. 10-88106, or the like; a triazine compound as described in Japanese Patent Application Publication No. 4-298503, Japanese Patent Application Publication No. 8-53427, Japanese Patent Application Publication No. 8-239368, Japanese Patent Application Publication No. 10-182621, Japanese Patent Application Publication No. 8-501291, or the like; a compound as described in Research Disclosure No. 24239; or a so-called fluorescent brightening agent, which is a compound that absorbs ultraviolet light and generates fluorescent light, typical examples being a stilbene or a benzoxazole compound.

An anti-fading agent is used in order to improve image conservation. For the anti-fading agent, it is possible to use various types of organic or metallic complex anti-fading agents. The organic anti-fading agent may be a hydroquinone, an alkoxyphenol, a dialkoxyphenol, a phenol, an aniline, an amine, an indane, a chromane, an alkoxyaniline, a heterocyclic compound, or the like, and a metallic complex anti-fading agent may be a nickel complex, a zinc complex, or the like. More specifically, it is possible to use a compound as described in the patents cited in Research Disclosure No. 17643, VII (I to J), No. 15162, No. 18716 (p. 650, left-hand column), No. 36544 (p. 527), No. 307105 (p. 872), or No. 15162, or a compound included in the general formulae and examples of typical compounds described in pages 127 to 137 of Japanese Patent Application Publication No. 62-215272.

Examples of an anti-rusting agent are: sodium dehydroacetate, sodium benzoate, sodium pyridine thione-1-oxide, p-hydroxybenzoate ethyl ester, 1,2-benzisothiazolin-3-one, or a salt thereof, or the like. It is desirable to use these materials at a rate of 0.02 wt % through 1.00 wt % in the ink.

For the pH adjuster, it is possible to use a neutralizing agent (an organic salt or inorganic alkali). In order to improve storage stability of the ink for inkjet recording, the pH adjuster is added desirably in such a manner that the pH of the ink is kept within a range of 6 through 10, and more desirably, in such a manner that the pH of the ink is kept within a range of 7 through 10.

The surface tension adjusting agent used in the present embodiment may be, for example, a nonionic surfactant, a cationic surfactant, an anionic surfactant, a betaine surfactant, or the like.

Furthermore, in order to achieve good droplet ejection from the inkjet apparatus, the added amount of the surface tension adjusting agent is set desirably to an amount whereby the surface tension of the ink becomes 20 mN/m through 60 mN/m, more desirably, to an amount whereby the surface tension becomes 20 mN/m through 45 mN/m, and even more desirably, to an amount whereby the surface tension becomes 25 mN/m through 40 mN/m.

Specific desirable examples of a surface active agent are: in a hydrocarbon system, an anionic surface active agent, such as a salt of a fatty acid, an alkyl sulfate ester salt, an alkyl benzene sulfonate salt, an alkyl naphthalene sulfonate salt, a dialkyl sulfosuccinate salt, an alkyl phosphate ester salt, a naphthalene sulfonate/formalin condensate, a polyoxyethylene alkyl sulfonate ester salt, or the like; or a non-ionic surface active agent, such as a polyoxyethylene alkyl ether, a polyoxyethylene alkyl aryl ether, a polyoxyethylene fatty acid ester, a sorbitan fatty acid ester, a polyoxyethylene sorbitan fatty acid ester, a polyoxyethylene alkyl amine, a glycerine fatty acid ester, an oxyethylene oxypropylene block copolymer, and the like. Furthermore, it is also desirable to use SURFYNOLS (Air Products & Chemicals Co. Ltd.), which is a acetylene-based polyoxyethylene oxide surface active agent. Furthermore, an amine oxide type of amphoteric surface active agent, such as N,N-dimethyl-N-alkyl amine oxide, is also desirable.

Moreover, it is also possible to use the surface active agents cited in pages 37 to 38 of Japanese Patent Application Publication No. 59-157636, and Research Disclosure No. 308119 (1989).

Furthermore, by using a fluorine (alkyl fluoride) type, or silicon type of surface active agent such as those described in Japanese Patent Application Publication No. 2003-322926, Japanese Patent Application Publication No. 2004-325707, and Japanese Patent Application Publication No. 2004-309806, it is possible to improve wear resistance.

Furthermore, it is also possible to use a surface tension adjuster of this kind as an anti-foaming agent; and a fluoride compound, a silicone compound, or a chelating agent, such as EDTA, can also be used.

There follows a detailed description of the treatment liquid which is used to change the pH of the aqueous dispersion medium of the ink composition by making contact with the ink composition described above.

Ink Set

The ink set according to an embodiment of the present invention comprises the above-described ink composition and a treatment liquid which changes the zeta potential of the water-insoluble particles B by changing the pH of the aqueous dispersion medium in the ink composition.

The pH of the treatment liquid used in the present embodiment is desirably 1 through 6, more desirably, 2 through 5, and even more desirably, 3 through 5. Furthermore, as the compound used to make the treatment liquid acidic, it is possible to use a compound including a phosphoric acid group, a phosphonic acid group, a phosphinic acid group, a sulfuric acid group, a sulfonic acid group, a sulfinic acid group, or a carboxylic acid group, or salts of the compound, and desirably, a compound including a phosphoric acid group or a carboxylic acid group is used, and even more desirably, a compound including a carboxylic acid group is used. Furthermore, it is possible to add to the treatment liquid a compound having a furan, pyrrole, pyrroline, pyrrolidone, pyrone, pyrrole, thiophene, indole, pyridine or quinoline structure, and also having a carboxyl group as a functional group, or the like, for example, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, or derivatives of these compounds, salts of these, or the like.

Moreover, of the compounds described above, it is desirable to use pyrrolidone carboxylic acid, pyrone carboxylic acid, furan carboxylic acid, coumaric acid, or derivatives of these compounds, or salts of these. One of these compounds may be used alone, or two or more of these compounds may be used in combination.

Furthermore, the treatment liquid may contain another additive, provided that it does not impede the beneficial effects of the present invention. The other additive may be, for example, a commonly known additive, such as an anti-drying agent (moisturizing agent), an anti-fading agent, an emulsion stabilizer, a permeation promoter, an ultraviolet absorber, a preservative, an antibacterial agent, a pH adjuster, a surface tension adjuster, an antifoaming agent, a viscosity adjuster, a dispersant, a dispersion stabilizer, an anti-rusting agent, a chelating agent, or the like.

The agents stated as specific examples of the other additives included in the ink described above can be used.

Next, the inkjet recording method which uses the ink set according to an embodiment of the present invention and the inkjet recording apparatus for same will be described.

Inkjet Recording Apparatus

FIG. 1 is a diagram showing one example of the general composition of a transfer type of inkjet recording apparatus which implements the inkjet recording method using an ink set according to an embodiment of the present invention.

As shown in FIG. 1, the inkjet recording apparatus 10 according to the present embodiment principally comprises: an intermediate transfer body 12, a treatment liquid deposition unit 14, an ink ejection unit 16 and a transfer unit 18, and it also comprises a solvent removal unit 20, a cleaning unit 22 and an image fixing unit 24.

The intermediate transfer body 12 is constituted by an endless belt having a prescribed width, and it is wound about a plurality of rollers 26. In the present embodiment, for example, four rollers 26A to 26D are used. The intermediate transfer body 12 is not limited to being an endless belt, and it may also be formed by a sheet-shaped intermediate transfer body which is conveyed by a conveyor belt, or a drum-shaped member.

The driving force of a motor (not illustrated) is transmitted to at least one main roller of the plurality of rollers 26, and by driving this motor, the intermediate transfer body 12 is caused to rotate about the outer side of the respective rollers 26 (26A to 26D) in the counter-clockwise direction in FIG. 1 (hereinafter, called the "direction of rotation of the intermediate transfer body").

A recording head (treatment liquid head) 30S corresponding to the treatment liquid is provided in the treatment liquid deposition unit 14. The treatment liquid head 30S ejects treatment liquid from an ejection surface which opposes the intermediate transfer body 12. Accordingly, treatment liquid is deposited onto the recording surface 12a of the intermediate transfer body 12. The treatment liquid deposition unit 14 is not limited to a method which ejects from a nozzle-type of head and it may employ an application method based on an application roller. With this application method, it is possible to deposit treatment liquid readily onto virtually the whole surface of the intermediate transfer body 12 including the image region where ink droplets are deposited. In this case, it is desirable that the thickness of the treatment liquid on the intermediate transfer body 12 should be 1 to 5 µm. It is also possible to provide a device which regularizes the thickness of the treatment liquid on the intermediate transfer body 12. For example, there is a method which uses an air knife and a method in which a member having a sharp angle is provided at a specific gap corresponding to the thickness of the treatment liquid, from the intermediate transfer body 12.

The ink ejection unit 16 is disposed on the downstream side of the treatment liquid deposition unit 14 in terms of the direction of rotation of the intermediate transfer body. The ink ejection unit 16 comprises recording heads (ink heads) 30K, 30C, 30M and 30Y corresponding respectively to the inks of the colors of black (K), cyan (C), magenta (M) and yellow (Y). Respective inks which satisfy the ink composition conditions of the present invention are filled into the respective ink storage units (not illustrated) which correspond to the inks of the respective colors, and these inks are supplied to the recording heads 30K, 30C, 30M and 30Y.

The ink heads 30K, 30C, 30M and 30Y respectively eject inks of the corresponding colors, from ejection surfaces which oppose the intermediate transfer body 12. Accordingly, inks of respective colors are deposited onto the recording surface 12a of the intermediate transfer body 12.

The treatment liquid head 30S and the ink heads 30K, 30C, 30M and 30Y are all full line heads formed with a plurality of ejection ports (nozzles) through the maximum recordable width of an image formed on the intermediate transfer body 12. This makes it possible to records images at higher speed onto the intermediate transfer body 12, compared to a serial head which records by scanning a short shuttle head back and forth reciprocally in the breadthways direction of the intermediate transfer body 12 (the front/rear direction in FIG. 1). Of course, the present invention can also be applied suitably to a serial head system which is capable of relatively high-speed recording, for example, a one-pass recording system which forms one line by means of one scan.

In the present embodiment, all of the recording heads (the treatment liquid head 30S, the ink heads 30K, 30C, 30M and 30Y) have the same structure, and below, a representative example of the recording heads is indicated by the reference numeral 30.

When a treatment liquid has been ejected from the treatment liquid head 30S onto the intermediate transfer body 12, then due to the rotation of the intermediate transfer body 12, the region of the intermediate transfer body 12 on which treatment liquid has been deposited is moved successively to positions directly below the ink heads 30K, 30C, 30M and 30Y, and corresponding inks of respective colors are ejected from the ink heads 30K, 30C, 30M and 30Y.

Desirably, the treatment liquid deposition amount and the ink deposition amount are adjusted according to requirements. For example, the deposition amount of the treatment liquid can be changed in order to adjust the properties, such as the viscosity, of the aggregate which is created when the treatment liquid and the ink mix together, in accordance with the recording medium to which the aggregate is to be transferred.

The solvent removal unit 20 is disposed on the downstream side of the ink ejection unit 16 in terms of the direction of rotation of the intermediate transfer body. The solvent removal unit 20 comprises a solvent removal roller 32 which faces the roller 26A via the intermediate transfer body 12. The solvent removal roller 32 is constituted by a porous material in the shape of a roller, and it is disposed in such a manner that it abuts against the recording surface 12a of the intermediate transfer body 12. Other modes involve a method which removes excess solvent from the intermediate transfer body 12 by means of an "air knife", or a method which removes the solvent by heating and evaporating it, or the like. Any solvent removal method may be used, but desirably, a method which does not use heating is employed. In a device which causes the solvent to evaporate by heating the surface of the transfer body or by applying heat to the aggregate on the transfer body, due to excessive heating of the aggregate, an excessive amount of solvent may be removed and it may be impossible to maintain the desired viscosity of the aggregate during transfer, leading in term to a decline in transfer characteristics. A further concern is the effect which the heat of the intermediate transfer body may have on the ink ejection characteristics of the inkjet head.

In the solvent removal unit 20, the solvent on the recording surface 12a of the intermediate transfer body 12 is removed by means of the solvent removal roller 32. Therefore, even if a large amount of treatment liquid is deposited onto the recording surface 12a of the intermediate transfer body 12, the solvent is removed by the solvent removal unit 20 and consequently, there is no transfer of large quantities of solvent (aqueous dispersion medium) to the recording medium 34, in the transfer unit 18. Consequently, even in cases where paper is used as the recording medium 34, the characteristic problems of aqueous solvents, such as curling and cockling, do not occur.

By removing excessive solvent from the aggregate by means of the solvent removal unit 20, it is possible to condense the aggregate and increase the internal aggregating force. Consequently, the fusion of the resin particles contained in the aggregate is promoted effectively, and therefore a stronger internal aggregating force can be achieved in the aggregate, until reaching the transfer stage. Moreover, by effectively condensing the aggregate by removal of the solvent, it is also possible to impart good fixing characteristics and good luster to the image even after the image has been transferred onto the recording medium.

It is not absolutely necessary for the solvent removal unit 20 to remove all of the solvent. If excessive solvent is removed and the ink aggregate is condensed excessively, then this is undesirable since the adhesive force of the aggregate on the transfer body becomes too strong and an excessive pressure is required to achieve transfer. Consequently, it is desirable that a small quantity of solvent should be left in order to maintain suitable viscosity for transfer. Another beneficial effect of leaving a small quantity of solvent is that since the aggregate is hydrophobic and the non-volatile solvent component (principally, the organic solvent, such as glycerine) is hydrophilic, then the aggregate and the residual solvent component separate after solvent removal, and a thin liquid layer consisting of the residual solvent component is formed between the aggregate and the intermediate transfer body. Consequently, the adhesive force of the aggregate on the transfer body is weakened, and this is beneficial for improving transfer characteristics.

The transfer unit 18 is disposed on the downstream side of the solvent removal unit 20 in terms of the rotational direction of the intermediate transfer body. The transfer unit 18 comprises a pressurization roller 36 at a position facing the roller 26B via the intermediate transfer body 12. A heater 37 is provided inside the pressurization roller 36 and the temperature of the outer surface of the pressurization roller 36 is heated by this heater 37. The recording medium 34 is conveyed from the left-hand side to the right-hand side in FIG. 1, in such a manner that it passes between the intermediate transfer body 12 and the pressurization roller 36. When the medium passes between the intermediate transfer body 12 and the pressurization roller 36, the front surface side of the recording medium 34 makes contact with the recording surface 12a of the intermediate transfer body 12, and pressure is applied by the pressurization roller 36, from the rear surface side of the recording medium 34, thereby causing the image formed on the recording surface 12a of the intermediate transfer body 12 to be transferred onto the recording medium 34. In this way, in the present invention, a desirable structure is one where the heating unit is limited only to the transfer section of the transfer body. By means of this structure, it is possible to prevent excessive thermal load caused by heating the surface of the transfer body, and excessive removal of the solvent component contained in the aggregate. Furthermore, by heating the aggregate by means of the transfer unit 18, almost all of the solvent included in the aggregate is removed, and this, together with the physical condensing effect created by pressurization promotes fusion of the resin, which in turn makes it possible to apply an even stronger internal aggregating force to the aggregate in the region where the transfer body makes contact with the heating and pressurizing rollers, in the short period of time from immediately after the transfer step until the performance of transfer.

Even if the solvent removal step is not carried out before transfer, the solvent can be removed in a short period of time by heating, and therefore does not present much of a problem. However, if the solvent removal step is carried out, then the absolute amount of solvent to be evaporated and removed in the transfer unit is only small, and this not only makes the condensing effect more beneficial, but also makes it possible to reduce the thermal load during transfer. Moreover, by effectively condensing the ink aggregate by heating in the transfer unit, it is also possible to impart good fixing characteristics and good luster to the image even after the image has been transferred onto the recording medium.

Moreover, it is also possible freely to adjust the temperature and pressure during transfer, to conditions which are suitable in respect of the recording medium and printing conditions used, and the like.

Furthermore, according to requirements, it is also possible to adopt a structure comprising a surface layer with separating properties, for the surface of the intermediate transfer body 12. On the surface of the transfer body having separating properties, since the surface energy is low and the separating characteristics are strong, then it is possible to achieve a high transfer rate. In the present invention, it is possible to achieve a sufficiently good transfer rate, even if the intermediate transfer body 12 is not especially given separating properties, but imparting separating properties to the surface of the intermediate transfer body is certainly not a drawback from the viewpoint of the cleaning load, and the like. Here, a surface having separating properties as referred to in the present invention means a surface having a critical surface tension of 30 mN/m or less, or an angle of contact with water of 75° or above.

A desirable material for use in the surface layer of the intermediate transfer body 12 is, for example, a polyurethane resin, a polyester resin, a polystyrene resin, a polyolefin resin, a polybutadiene resin, a polyamide resin, a polyvinyl chloride resin, a polyethylene resin, a fluorine resin, a polyimide resin, or other such commonly known materials.

The cleaning unit 22 is disposed on the downstream side of the transfer unit 18 in terms of the direction of rotation of the transfer body, and on the upstream side of the treatment liquid deposition unit 14 in terms of the direction of rotation of the transfer body. The cleaning unit 22 comprises a cleaning roller 38, which is provided in a position facing the roller 26C via the intermediate transfer body 12 and is disposed so as to abut against the recording surface 12a of the intermediate transfer body 12, thereby removing the residual matter, and the like, which is left on the recording surface 12a of the intermediate transfer body 12 after transfer.

The cleaning roller 38 may be made of a flexible and porous member, which cleans the surface of the intermediate transfer body (recording surface 12a) while impregnating same with cleaning liquid from a cleaning liquid deposition device, or a brush may be provided on the surface of the cleaning roller 38 and dirt may be removed from the surface of the intermediate transfer body with the brush, while depositing cleaning liquid onto the surface of the intermediate transfer body. Alternatively, residual material on the surface of the intermediate transfer body may be wiped away by providing a flexible blade on the surface of the cleaning roller 38. Making the linear speed of the surface of the cleaning roller 38 slower or faster than the linear speed of the surface of the intermediate transfer body, rather than the same speed, enables the removal rate of the residual matter to be increased. This is because the speed differential between the surface of the cleaning roller 38 and the surface of the intermediate transfer body generates a shearing force at the surface of the intermediate transfer body, and this causes the residual matter to be removed effectively.

In the present invention, according to requirements, it is also possible to provide an image fixing unit 24 separately, in order to impart stronger fixing characteristics to the is recording medium after transfer of the aggregate.

The image fixing unit 24 is disposed on the recording medium output side of the transfer unit 18 (the right-hand side in FIG. 1). The image fixing unit 24 comprises two fixing rollers 40A and 40B, provided at the front and rear surfaces of the recording medium 34, and by heating and pressurizing the image transferred onto the recording medium 34 by means of these fixing rollers 40A and 40B, it is possible to increase the fixing characteristics of the recording image on the recording medium 34. The fixing rollers 40A and 40B are desirably a pairs of rollers composed of one pressurizing roller and one heating roller, but they are not limited to this configuration.

Furthermore, in the present invention, it is also possible to provide a device (not illustrated) for carrying out a heating process with respect to the recording medium 34, before the recording medium is conveyed to the transfer unit 18.

Since the recording medium 34 which makes direct contact with the aggregate has already reached the prescribed transfer temperature, then it is possible to conduct the heat efficiently during the shorter transfer nip period. Furthermore, since the recording medium is heated previously to a prescribed transfer temperature, compared to a case where it is heated only during the transfer nip operation, then good contact is achieved between the ink aggregate and the recording medium surface. This temperature can be adjusted freely according to the type of recording medium 34, and it is also possible to control the viscosity of the ink aggregate by controlling this temperature.

If the recording medium 34 has a large number of surface undulations caused by the pulp fibers, as in the case of normal paper or high-grade paper, and hence an anchoring effect can be expected between the aggregate and the surface of the recording medium, then by adjusting the viscosity of the aggregate through directly controlling the heating temperature on the medium surface with which the ink makes contact during transfer, rather than the heating temperature in the transfer unit, it is possible to impart good fixing characteristics on the normal paper, high-grade paper, or the like, by setting the aggregate to an optimum viscosity.

Furthermore, in the case of a recording medium 34 having a flat surface, such as coated paper, by controlling the viscosity of the aggregate to a relatively harder viscosity that that used for recording media having surface undulations, it is possible to impart good fixing characteristics after transfer.

Inkjet Recording Method

There follows an explanation of the inkjet recording method of the present invention for recording images by using the ink set according to an embodiment of the present invention in an inkjet recording apparatus having the composition described above. Furthermore, in the course of describing the recording medium, the mechanism of the ink aggregating reaction according to the present invention is also described.

Figure 2:
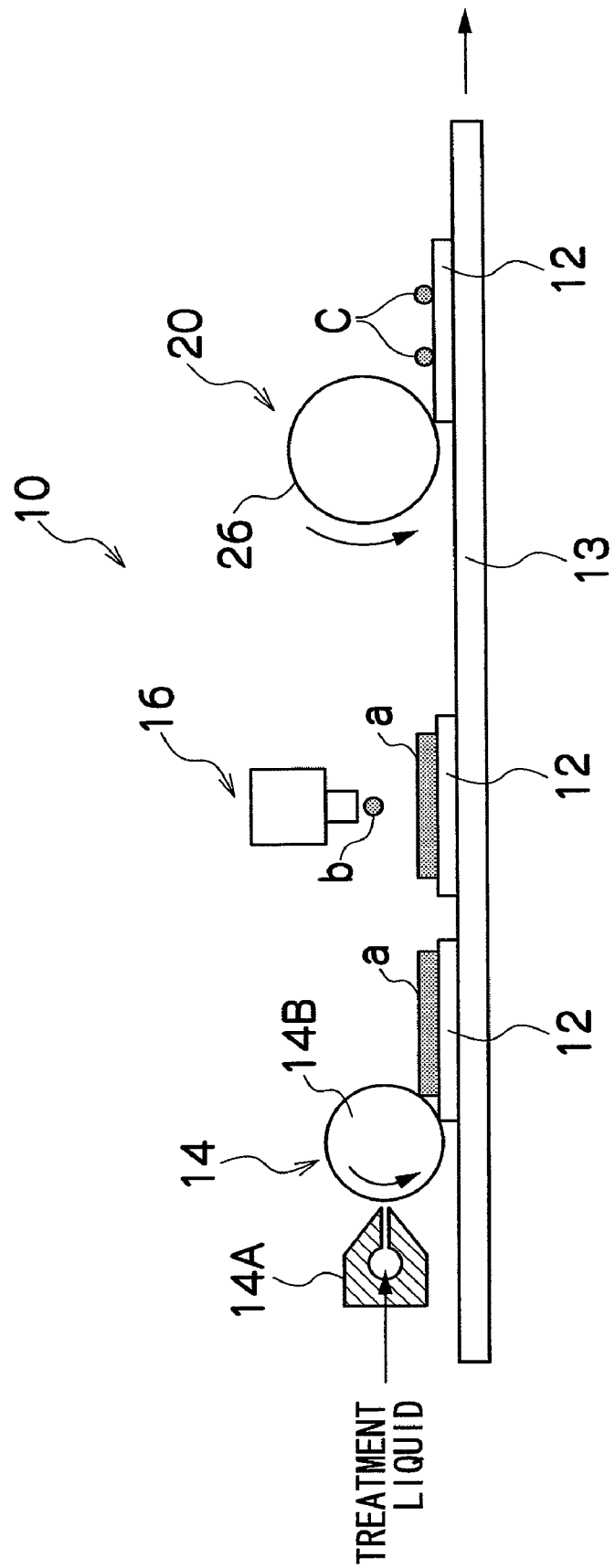
FIG. 2 is a conceptual diagram showing only the portions required in order to describe the recording method according to an embodiment of the present invention.

FIG. 2 is a conceptual diagram which shows only the parts of the inkjet recording apparatus in FIG. 1 which are necessary for describing the present invention, and it depicts a system where the treatment liquid is deposited onto the intermediate transfer body by means of an application method, and the intermediate transfer body is conveyed by means of a belt conveyor 13.

When implementing the inkjet recording method according to the present invention, firstly, a treatment liquid "a" ejected from an application head 14A is supplied to an application roller 14B, and is then applied in the form of a thin film onto the intermediate transfer body 12, by means of the application roller 14B (treatment liquid application step).

Thereupon, the intermediate transfer body 12 onto which the treatment liquid "a" has been coated is conveyed to the position of the recording head 16 by the belt conveyor 13, and the ink "b" according to the present invention is ejected in the form of droplets, and thus comes into contact with the treatment liquid "a" (contact step). Consequently, the water-insoluble particles A and the water-insoluble particles B aggregate rapidly and form an aggregate "c" (aggregating step).

Figure 3:
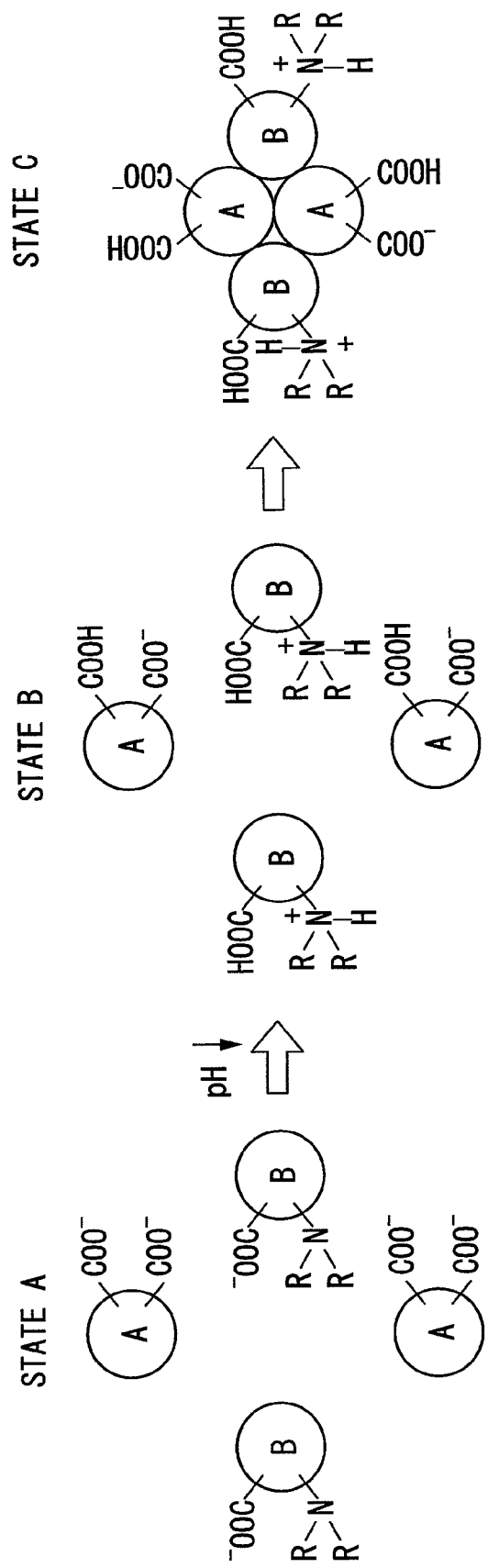
FIG. 3 is an illustrative diagram for describing the mechanism of the aggregating reaction of the ink set according to an embodiment of the present invention.

FIG. 3 is a diagram showing the mechanism of the ink aggregating reaction according to the present invention. The ink aggregating reaction proceeds through three states A, B and C shown in FIG. 3.

In the state A of FIG. 3, the water-insoluble particles A which include the organic pigment and the dispersant, and the water-insoluble particles B are dispersed in the aqueous dispersion medium of the ink composition. The water-insoluble particles A are constituted of the organic pigment and the dispersant adsorbing on the surface of the organic pigment. The water-insoluble particles A are charged negatively because of two carboxyl ions, which are anions, on the surface of the water-insoluble particles A, as shown in the state A of FIG. 3. On the other hand, the water-insoluble particles B, which include a polymer latex, have one carboxyl ion, which is an anion, and one cationic group (i.e., an amino group), in the example shown in FIG. 3.

Therefore, as shown in the state A of FIG. 3, when the ink "b" has been ejected from the droplet ejection nozzles and before it makes contact with the treatment liquid "a", in other words, before the change in the pH of the aqueous dispersion medium of the ink "b", the anions of the water-insoluble particles A and the anions of the water-insoluble particles B are mutually repulsed since they have the same polarity (negative polarity), and therefore the water-insoluble particles A and the water-insoluble particles B stay in a dispersed state and do not aggregate. Consequently, the water-insoluble particles A and the water-insoluble particles B do not aggregate inside the droplet ejection nozzles or the ink storage tank (or cartridge) which supplies ink to the droplet ejection nozzles.

Thereupon, when the ink "b" makes contact with the treatment liquid "a" on the intermediate transfer body 12 and the pH of the ink "b" declines and becomes acidic, then a portion of the anions of the water-insoluble particles A bond with the hydrogen ions (protons) and the amount of negative charge decreases as shown in the state B of FIG. 3. On the other hand, the anions of the water-insoluble particles B bond with the hydrogen ions, and in addition to this, the hydrogen ions bond with the cationic group and become positively charged as shown in the state B of FIG. 3.

Consequently, the remaining anions of the water-insoluble particles A and the cations of the water-insoluble particles B are mutually attracted, and the water-insoluble particles A and the water-insoluble particles B aggregate instantaneously, as shown in the state C of FIG. 3. Although described in detail in the practical examples given below, according to the aggregating mechanism of the present invention, the time taken from the ink being deposited and contacting with the treatment liquid until becoming aggregated is an instantaneous period of approximately one second.

Figure 4:
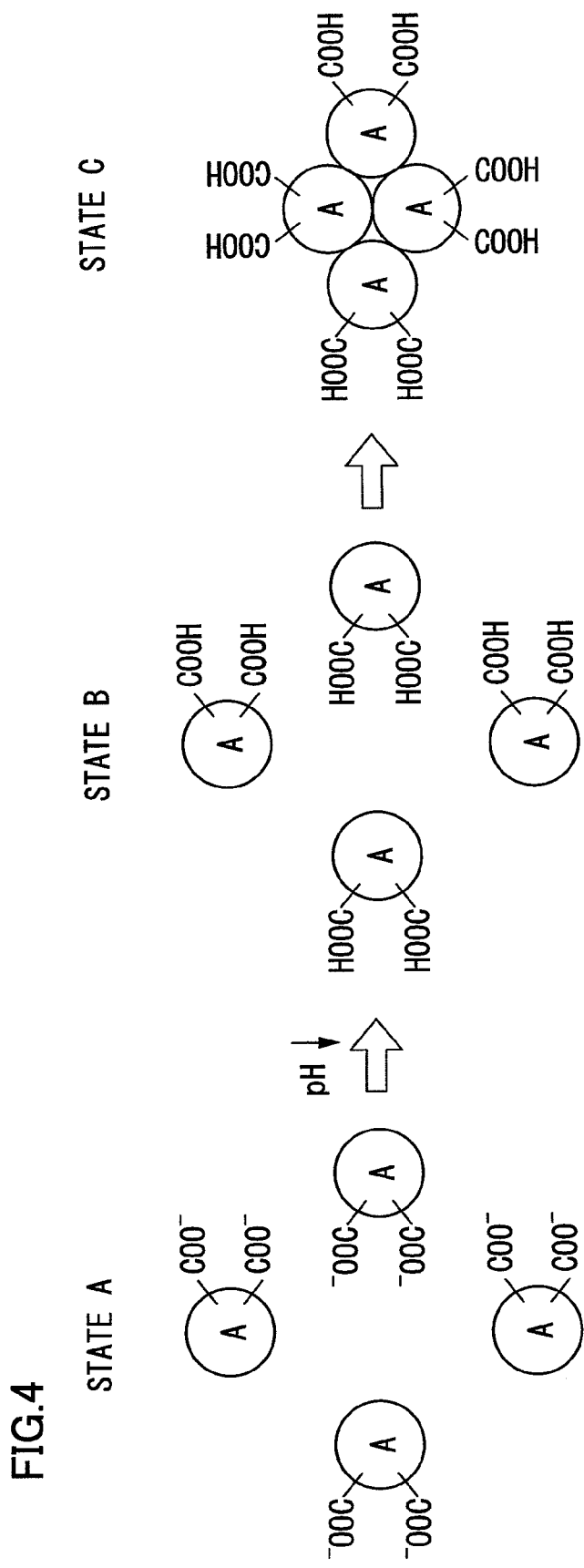
FIG. 4 is an illustrative diagram for describing the mechanism of the aggregating reaction of the ink set according to the related art.

FIG. 4 is a diagram showing the mechanism of the aggregating reaction in the related art. The ink aggregating reaction in the related art proceeds through three states A, B and C shown in FIG. 4.

In the related art, particles contained in the ink is only particles constituted of organic pigment particle and dispersant adsorbing the surface of the pigment particle. In other words, the ink composition of the related art contains water-insoluble particles A only, and it contains no water-insoluble particles B. As shown in the state A of FIG. 4, the ink water-insoluble particles A are negatively charged because of two carboxyl ions, which are anions.

Therefore, before ejecting droplets of ink, in other words, before making contact with the treatment liquid, the particles repulse each other due to the respective anions they have, and therefore they maintain a dispersed state and do not aggregate. Thereupon, by bringing the ink into contact with a treatment liquid, thereby lowering the pH of the ink and causing the ink to become acidic, the hydrogen ions bond with the anions as shown in the state B of FIG. 4. As a result, the water-insoluble particles A cease to repulse each other, and they therefore aggregate together naturally. This ink aggregating mechanism of the related art, which is based on natural aggregation, requires a long time of approximately 15 seconds from the deposition of ink and contact with the treatment liquid, until aggregation occurs.

The present embodiment has been described with respect to an example in which the ink set according to the present invention is used in a transfer type of inkjet recording method, but it is also possible to use the ink set in a recording method which records directly onto a recording medium, in which case the aggregation of the ink can also be performed swiftly.

Examples

Next, practical examples using the ink set according to the present invention, which comprises the ink and the treatment liquid according to the present invention, are described, but the present invention is not limited to these practical examples.

Preparation of the Ink

<<Preparation of Cyan Ink C1-1>>

(Preparation of Cyan Dispersion Liquid as Water-Insoluble Particles A)

A mixed solution including 6 parts by mass of styrene, 11 parts by mass of stearyl methacrylate, 4 parts by mass of styrene macromer AS-6 (manufactured by Toagosei Co., Ltd.), 5 parts by mass of "Premmer" PP-500 (manufactured by NOF Corp.), 5 parts by mass of methacrylic acid, 0.05 parts by mass of 2-mercapto ethanol, and 24 parts by mass of methylethyl ketone was prepared in a reaction vessel.

On the other hand, a mixed solution was prepared by introducing, into a titration funnel, 14 parts by mass of styrene, 24 parts by mass of stearyl methacrylate, 9 parts by mass of styrene macromer AS-6 (manufactured by Toagosei Co., Ltd.), 9 parts by mass of "Premmer" PP-500 (manufactured by NOF Corp.), 10 parts by mass of methacrylic acid, 0.13 parts by mass of 2-mercapoto ethanol, 56 parts by weight of methylethyl ketone, and 1.2 parts by mass of 2,2'-azobis (2,4-dimethyl valeronitrile).

Thereupon, the mixed solution inside the reaction vessel was raised to a temperature of 75° C. while being agitated, in a nitrogen atmosphere, and the mixed solution in the titration funnel was gradually added by titration over a period of one hour. When two hours had passed after the end of titration, a solution obtained by dissolving 1.2 parts by mass of 2,2'-azobis (2,4-dimethyl valeronitrile) in 12 parts by mass of methylethyl ketone was added by titration over a period of three hours, and the mixture was matured for two hours at 75° C. and two hours at 80° C., thereby yielding a polymer dispersant solution.

A portion of this polymer dispersant solution was isolated by removing the solvent, and the solid thus obtained was diluted to 0.1% by mass with tetrahydrofuran, and then the weight-average molecular weight was measured by passing it through a high-speed GPC (gel permeation chromatography) apparatus HLC-8220 GPC, comprising a sequential three-apparatus line of a TSKgeL Super HZM-H, a TSKgeL SuperHZ4000, and a TSKgeL SuperHZ2000 (manufactured by Tosoh Corp.). The result of this measurement was that the isolated solid material had a weight-average molecular weight of 25,000, indicated as the molecular weight of polystyrene.

Furthermore, 5.0 g, by solid conversion, of the obtained polymer dispersant solution, 10.0 g of the cyan pigment, Pigment Blue 15:3 (manufactured by Dainichiseika Color & Chemical Mfg. Co., Ltd.), 40.0 g of methylethyl ketone, 8.0 g of 1 mol/L sodium hydroxide, 82.0 g of deionized water, and 300 g of 0.1 mm zirconia beads were supplied to a vessel, and dispersed for 6 hours at 1000 rpm in a "Ready Mill" dispersion machine (manufactured by IMEX Co., Ltd.). The dispersion liquid thus obtained was depressurized and condensed in an evaporator until the methylethyl ketone had been sufficiently removed, and the condensation of the dispersion liquid was carried out until the concentration of the pigment reaches 10%, thereby yielding a cyan dispersion liquid C1 forming the water-insoluble particles A. The average particle size of this cyan dispersion liquid C1 was 77 nm.

Furthermore, for the water-insoluble particles B, the latex LX-07 was used, of the polymer latexes LX-01 to LX-18. The composition and the molecular weight of the latex LX-07 are as follows.

(Latex LX-07: Composition and Molecular Weight)

| (Composition) | |
|---|---|
| methyl methacrylate: | 45 mol % |
| ethyl acrylate: | 45 mol % |
| methacrylic acid: | 7 mol % |
| dimethyl aminoethyl methacrylate: | 3 mol % |
| (Molecular weight) | |
| Mw: 16000, Mn: 5200 | |

An ink C1-1 was prepared by using the cyan dispersion liquid C1 as the water-insoluble particles A and the latex LX-07 as the water-insoluble particles B, so as to achieve the ink composition described below, and then removing large particles with a 5 μm filter.

(Ink Composition of Ink C1-1)

Ink C1-1 was constituted of: Cyan pigment (Pigment Blue 15:3) manufactured by Dainichiseika Color & Chemical Mfg. Co., Ltd.; polymer dispersant; Latex LX-07; Diethylene glycol manufactured by Wako Chem. Co., Ltd.; glycerine; Olfine E1010 manufactured by Nissin Chemical Industry Co., Ltd.; and deionized water. The composition of the ink C1-1 was as follows.

| Cyan pigment (Pigment Blue 15:3): | 4% by mass |
|---|---|
| Polymer dispersant: | 2% by mass |
| Latex LX-07: | 8% by mass |
| Diethylene glycol: | 10% by mass |
| Glycerine: | 20% by mass |
| Olfine E1010: | 1% by mass |
| Deionized water: | 55% by mass |

<<Preparation of Ink C1-2>>

An ink C1-2 having the composition described below was prepared by a similar method to the foregoing, with the exception that the latex LX-07 of the ink C1-1 was changed to LX-07B. The latex LX-07B was different from the latex LX-07 in that the ratio between the methacrylic acid and the dimethyl aminoethyl methacrylate in the LX-07B composition was 9:1, whereas the ratio between the methacrylic acid and the dimethyl aminoethyl methacrylate in the LX-07 composition was 7:3.

(Latex LX-07B: Composition and Molecular Weight)

| (Composition) | |
|---|---|
| methyl methacrylate: | 45 mol % |
| ethyl acrylate: | 45 mol % |
| methacrylic acid: | 9 mol % |
| dimethyl aminoethyl methacrylate: | 1 mol % |
| (Molecular weight) | |
| Mw: 16000, Mn: 5000 | |

<<Preparation of Ink C1-3>>

An ink C1-3 was prepared by a similar method to the foregoing, with the exception that the latex LX-07 of the ink C1-1 was changed to LX-07C. In the latex LX-07B, the ratio between the methacrylic acid and the dimethyl aminoethyl methacrylate, which was 7:3 in the LX-07 composition, is changed to 1:9.

(Latex LX-07C: Composition and Molecular Weight)

| (Composition) | |
|---|---|
| methyl methacrylate: | 45 mol % |
| ethyl acrylate: | 45 mol % |
| methacrylic acid: | 1 mol % |
| dimethyl aminoethyl methacrylate: | 9 mol % |
| (Molecular weight) | |
| Mw: 18000, Mn: 5000 | |

<<Preparation of ink C1-H>>

An ink C1-H was prepared by a similar method to the foregoing, with the exception that a latex LX-H which does not reverse polarity was used instead of the latex LX-07 in ink C1-1.

(Chemical Structure of Latex LX-H)

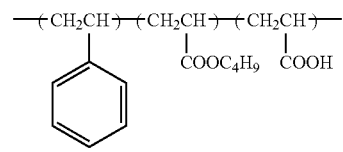

(Latex LX-H: Composition and Molecular Weight)

| (Composition) | |
|---|---|
| styrene: | 65 mol % |
| butyl acrylate: | 30 mol % |
| acrylic acid: | 5 mol % |
| (Molecular weight) | |
| Mw: 400,000; Mn: 60,000 | |

(Ink Composition of Ink C1-H)

The ink C1-H was constituted of: Cyan pigment (Pigment Blue 15:3) manufactured by Dainichiseika Color & Chemical Mfg. Co., Ltd.; polymer dispersant; Latex LX-H; Diethylene glycol manufactured by Wako Chem. Co., Ltd.; glycerine; Olfine E1010 manufactured by Nissin Chemical Industry Co., Ltd.; and deionized water. The composition of the ink C1-1 was as follows.

| Cyan pigment (Pigment Blue 15:3): | 4% by mass |
|---|---|
| Polymer dispersant: | 2% by mass |
| Latex LX-H: | 8% by mass |
| Diethylene glycol: | 10% by mass |
| Glycerine: | 20% by mass |
| Olfine E1010: | 1% by mass |
| Deionized water: | 55% by mass |

<<Preparation of Ink C2-1>>

26.7 g of Cabojet 250 (15% cyan pigment dispersion liquid C2 made by Cabot Corp.), 8 g of latex (by solid conversion), 20 g of glycerine, 10 g of glycerine, and 1 g of Olfine E1010, were mixed together, and finally dispersed in deionized water to prepare an ink having a total mass of 100 g. The composition of ink C2-1 is as follows.

(Ink Composition of Ink C2-1)

| | |
|---|---|
| Cyan pigment (Cabojet 250 made by Cabot Corp.) | 4% by mass |
| Latex LX-07 | 8% by mass |
| Diethylene glycol (made by Wako Chem. Co., Ltd.) | 10% by mass |
| Glycerine | 20% by mass |
| Olfine E1010 (made by Nisshin Chemical Industries) | 1% by mass |
| Deionized water | 57% by mass |

<<Preparation of ink C2-H>>

An ink C2-H having the following composition was prepared by a similar method to the foregoing, with the exception that the aforementioned latex LX-H which does not reverse polarity was used instead of the latex LX-07 in ink C2-1.

(Ink Composition of Ink C2-H)

| | |
|---|---|
| Cyan pigment (Cabojet 250 made by Cabot Corp.) | 4% by mass |
| Latex LX-H | 8% by mass |
| Diethylene glycol (made by Wako Chem. Co., Ltd.) | 10% by mass |
| Glycerine | 20% by mass |
| Olfine E1010 (made by Nisshin Chemical Industries) | 1% by mass |
| Deionized water | 57% by mass |

<<Preparation of Magenta Ink M1-1>>

400 g of Cromophtal Jet Magenta DMQ (made by Ciba Specialty Chemicals), 40 g of sodium oleinate (made by Wako Chem. Co., Ltd.), 200 g of glycerine (made by Wako Chem. Co., Ltd.) and 1360 g of deionized water were kneaded for one hour in a mortar, and then subjected to coarse dispersion for 20 minutes in a US-600 CCVP ultrasonic dispersion apparatus fitted with an agitating device, made by Nippon Seiki Co., Ltd. (600 W, 50 mm ultrasonic oscillator unit).

Next, this coarse dispersion liquid and 1.3 kg of 0.05 mm zirconia beads were supplied to a Super Apex mill (model SAM-1) made by Kotobuki Engineering & Manufacturing Co., Ltd., and dispersion was carried out for 160 minutes at a rotational speed of 2500 rpm and a processing flow rate of 15 l/h. After completing the dispersion process, the material was filtered through a 32 µm filter, thereby yielding a 20 wt % magenta pigment dispersion liquid. By this means, a magenta dispersion liquid M1 is obtained as the water-insoluble particles A. The average particle size of the magenta dispersion liquid thus obtained was 70 nm.

Furthermore, the same latex LX-07 as that described above was used as the water-insoluble particles B.

An ink M1-1 was prepared by using the magenta dispersion liquid M1 as the water-insoluble particles A and the latex LX-07 as the water-insoluble particles B, so as to achieve the ink composition described below, and then removing large particles with a 5 µm filter.

(Ink Composition of Ink M1-1)

| | |
|---|---|
| Magenta pigment (Cromophtal Jet Magenta DMQ) | 4% by mass |
| Sodium oleinate (dispersant) | 0.4% by mass |
| Latex LX-07 | 8% by mass |
| Diethylene glycol (made by Wako Chem. Co., Ltd.) | 10% by mass |
| Glycerine (made by Wako Chem. Co., Ltd.) | 20% by mass |
| Olfine E1010 (made by Nisshin Chemical Industries) | 1% by mass |
| Deionized water | 56.6% by mass |

<<Preparation of Magenta Ink M1-H>>

A magenta ink M1-H having the composition indicated below was prepared by a similar method to the foregoing, with the exception that the aforementioned latex LX-H which does not reverse polarity was used instead of the latex LX-07 in ink M1-1.

(Ink Composition of Ink M1-H)

| | |
|---|---|
| Magenta pigment (Cromophtal Jet Magenta DMQ) | 4% by mass |
| Sodium oleinate (dispersant) | 0.4% by mass |
| Latex LX-H | 8% by mass |
| Diethylene glycol (made by Wako Chem. Co., Ltd.) | 10% by mass |
| Glycerine (made by Wako Chem. Co., Ltd.) | 20% by mass |
| Olfine E1010 (made by Nisshin Chemical Industries) | 1% by mass |
| Deionized water | 56.6% by mass |

Preparation of Treatment Liquid

Treatment liquids T-1 and T-2 having the compositions indicated below were prepared.

(Composition of Treatment Liquid T-1)

| | |
|---|---|
| 2-pyrrolidone-5-carboxylic acid (made by Tokyo Kasei) | 10 parts by mass |
| Lithium hydroxide monohydrate (made by Wako Chem. Co., Ltd.) | 2 parts by mass |
| Glycerine (made by Wako Chem. Co., Ltd.) | 13 parts by mass |
| Diethylene glycol (made by Wako Chem. Co., Ltd.) | 10 parts by mass |
| Olfine E1010 (made by Nisshin Chemical Industries) | 1.5 parts by mass |
| Deionized water | 73.5 parts by mass |

(Composition of Treatment Liquid T-2)

| | |
|---|---|
| 2-pyrrolidone-5-carboxylic acid (made by Tokyo Kasei) | 10 parts by mass |
| Lithium hydroxide monohydrate (made by Wako Chem. Co., Ltd.) | 2 parts by mass |
| Glycerine (made by Wako Chem. Co., Ltd.) | 13 parts by mass |
| Diethylene glycol (made by Wako Chem. Co., Ltd.) | 10 parts by mass |
| Olfine E1010 (made by Nisshin Chemical Industries) | 1.5 parts by mass |
| Fluorine surfactant | 0.1 parts by mass |
| Deionized water | 73.4 parts by mass |

The chemical structure of the fluorine-based surfactant was as indicated below.

(Fluorine-Based Surfactant 1)

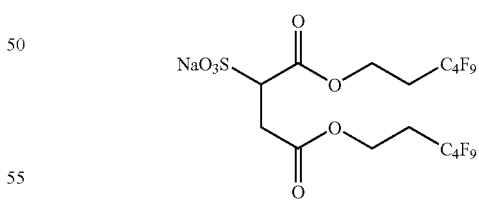

Thereupon, the physical properties of the obtained treatment liquid T-1 were measured, and the pH was 3.6, the surface tension was 28.0 mN/m, and the viscosity was 3.1 mPa·s. When the physical properties of the treatment liquid T-2 were measured, the pH was 3.6, the surface tension was 21.1 mN/m, and the viscosity was 2.9 mPa·s.

Relationship Between Zeta Potential and pH Environment of Dispersion Liquid and Latex LX The zeta potential and the average particle size (volume-average particle size) were measured for the dispersion liquid C1, the dispersion liquid C2 and the dispersion liquid M1, forming the water-insoluble particles A, and the latex LX-07, the latex LX-07B and the latex LX-07C forming the water-insoluble particles B, which were respectively prepared as described above. Furthermore, the zeta potential and the average particle size of the latex LX-H which was used in a comparative example were also measured.

The zeta potential was measured by means of a Nano Z zeta sizer (made by Sysmex Corporation). The sample materials were prepared by diluting the dispersion liquids suitably with water or a 0.1 mol/l sodium hydroxide solution, to a concentration suitable for measurement and a pH of 8 to 9. By performing titration with a 0.1 mol/l or 1 mol/l aqueous acetic acid solution using an attached MPT-2 automatic titration apparatus, the pH environment was changed gradually from pH 8 to pH 4, and the zeta potential was measured at pH 8, pH 5 and pH 4.

Furthermore, the average particle size was measured under the same conditions in all cases, by appropriately diluting the dispersion liquid to a concentration suitable for measurement, in a Microtrac UPA EX-150 apparatus (made by Nikkiso Co., Ltd.). In other words, the volume-average particle size was measured under conditions where particle transparency was "transparent", particle refraction index was 1.51, particle shape was "nonspherical", density was 1.2 g/cm$^3$, solvent was "water", and cell temperature was 18° C. to 25° C.

The measurement results are shown in Table 1 in FIG. 5.

As shown in Table 1, the respective dispersion liquids C1, C2, M1 forming the water-insoluble particles A each had a negative zeta potential and were negatively charged, even when the pH environment was changed from pH 8 to pH4.

On the other hand, the latexes LX-07 and LX-07C forming the water-insoluble particles B had a negative zeta potential and were negatively charged when the pH was 8, but at a pH of 4, the zeta potential was positive and the polarity had changed from negative to positive, due to the change in the pH environment.

Therefore, in the case of an ink which is formed by a combination of one of the dispersion liquids C1, C2 and M1 and one of the latex LX-07 and LX-07C, by maintaining the pH environment in the region of pH 8 before the ink makes contact with the treatment liquid, and then reducing the pH environment to the vicinity of pH 4 by making contact with the treatment liquid, it is possible to cause the ink to aggregate swiftly.

Furthermore, the latex LX-07B does not reverse polarity, even if the pH environment changes from 8 to 4, but the zeta potential reduces to almost zero. In this case, since the polarity is the same as each of the respective dispersion liquids which form the water-insoluble particles A, then there is no mutual attraction between the dispersion liquid and the latex, but since the zeta potential approaches zero, then the force of repulsion with respect to the dispersion liquid becomes smaller, and therefore aggregation can be promoted.

On the other hand, in the case of the latex LX-H, even if the pH environment changes from 8 to 4, the zeta potential at pH 4 is a large value of −25 mV, and therefore a large force of repulsion is produced with respect to the dispersion liquid. Consequently, aggregation is retarded.

The Physical Values of the Respective Inks Immediately after Manufacture

The physical values of the above-described inks C1-1, C1-2, C1-3, C2-1 and M1-1, and inks C1-H, C2-H and M1-H, immediately after manufacture were as shown in Table 2 of FIG. 6.

Temporal Stability Test and Droplet Ejection Test

Each of the inks prepared as described above was subjected to a temporal stability test and a droplet ejection test. The temporal stability test for the ink evaluates the stability of the particle size and the viscosity before the ink is ejected as droplets, in other words, when the ink is stored in the ink storage tank (or cartridge), and if this stability is poor, then problems of blockages in the droplet ejection nozzles will occur when the ink is ejected from the nozzles of the inkjet recording apparatus.

Furthermore, the speed of the aggregating reaction, from droplet ejection and mutual contact of the ink and treatment liquid, until aggregation, was investigated by means of a droplet ejection test.

(Temporal Stability Test for Ink)

The ink temporal stability test was carried out by respectively sealing 10 ml each of the inks according to the present invention C1-1, C1-2, C1-3, C2-1 and M1-1, and the inks of the comparative examples C1-H, C2-H, and M1-H, in a 15-ml glass bottle, and leaving for 14 days at 70° C. before measuring the average particle size and the viscosity.

The results of this evaluation are shown in Table 3 of FIG. 7. The pH values of the ink liquid for carrying out the temporal stability test were as shown in Table 2 of FIG. 6.

As Table 3 of FIG. 7 reveals, in inks having a molar ratio of the methacrylic acid to the dimethyl aminoethyl methacrylate of the latex LX-07 in the range of 80:20 to 20:80, no variations in the particle size or viscosity were observed when the physical properties were measured after leaving the ink for 14 days at 70° C., and hence these inks were stable even under high-temperature storage conditions. As a result, it can be confirmed that the temporal stability of the inks according to the present invention is equivalent to the temporal stability of conventional inks.

Droplet Ejection Test

The droplet ejection test was carried out in the following manner. More specifically, treatment liquid was coated by a wire bar coater (application coater based on a wire bar), to a film thickness of approximately 5 μm, onto an intermediate transfer body having a 0.5 mm-thick SR series silicone rubber sheet (made by Tigers Polymer Corp.). Furthermore, using a Ricoh GELJET G71 printer head, ink droplets were then ejected onto the intermediate transfer body at an image resolution of 1200×600 dpi and an ink droplet ejection volume of 12 pl. After ejection of the ink droplets, solvent removal was carried out by means of a solvent removal roller wrapped in a Crecia KayDry sheet, at respective intervals of 1 second, 2 seconds, 10 seconds, and 15 seconds. The speed of the aggregating reaction was evaluated by observing the adherence of coloring material to the KayDry sheet.

The results of this droplet ejection test are shown in Table 4 in FIG. 8. The adherence of coloring material to the KayDry sheet in the droplet ejection test shown in Table 4 was evaluated in the following manner.

A: no adherence of coloring material observed
B: slight adherence of coloring material observed
C: clear adherence of coloring material observable by visual check The verdict of "C" means that the aggregating reaction did not completed.

As shown in Table 4, all of the inks according to the present invention, C1-1, C1-2, C1-3, C2-1 and M1-1, apart from C1-2, showed the evaluation of "A" in all cases, and hence the aggregation of the ink could be completed within one second of droplet ejection.

Furthermore, even in the case of C1-2, the evaluation after one second from droplet ejection was "B", which indicates a level that does not present any problems in an actual recording scenario.

On the other hand, the inks of the comparative examples, C1-H and M1-H had "B" assessment 10 seconds after droplet ejection, and in the case of ink C2-H, the assessment was "C" even after 15 seconds from droplet ejection.

From the results of this droplet ejection test, it can be seen that by implementing the aggregating reaction mechanism described in FIG. 3 by using the inks according to the present invention, it is possible dramatically to accelerate the speed of the aggregating reaction in comparison with conventional inks.

Preparation of Self-Dispersing Polymer A-1

140.0 g of isopropyl alcohol was introduced into a 1-liter three-mouthed flask equipped with an agitator, a thermometer, a circulation cooling tube, and a nitrogen gas inlet tube, and it was heated to 75° C. While the internal temperature of the reaction vessel was kept at 75° C., a mixed solution including 62.6 g of methyl methacrylate, 62.6 g of ethyl acrylate, 8.4 g of methacrylic acid, 6.4 g of dimethyl aminoethyl methacrylate, 28 g of isopropyl alcohol, and 0.56 g of "V-601" (made by Wakon Junyaku (Co., Ltd.)) was added by titration at a uniform speed, in such a manner that titration was completed in two hours. After completing titration, the mixture was agitated for two hours, and a solution including 0.28 g of "V-601" and 14.0 g of isopropyl alcohol was added, agitation was continued for 2 hours at 75° C., a solution of 0.28 g of "V-601" and 14.0 g of isopropyl alcohol was further added, the temperature was raised to 85° C., and agitation was then continued for a further two hours.

The weight-average molecular weight (Mw) of the copolymer thus obtained was calculated by gel permeation chromatography (GPC) to be 42000, when indicated as the molecular weight of polystyrene. The columns used were a TSKgel Super HZM-H, TSKgel Super HZ4000, and TSKgel Super HZ200 (made by Toso Corporation), and the acid number was 38.9 (mg KOH/g).

Next, 337.1 g of the copolymer solution thus obtained was weighed out, 9.87 g of triethyl amine was added, and the temperature inside the reaction vessel was raised to 80° C. Thereupon, 426.7 g of distilled water was added, and a polymer dispersion in which the copolymer is dispersed in water was obtained. The internal temperature of the reaction vessel was kept at 80° C. for 2 hours under atmospheric pressure, and then the pressure inside the reaction vessel was reduced, a total of 258.7 g of isopropyl and distilled water was removed, and an aqueous dispersion of self-dispersing polymer (A-01) having a solid concentration of 28.0% was obtained as the water-insoluble particles B.

The figures relating to the respective constituent units of the self-dispersing polymer (A-01) described below indicate mol ratios.

| (Composition) | |
|---|---|
| methyl methacrylate: | 45 mol % |
| ethyl acrylate: | 45 mol % |
| methacrylic acid: | 7 mol % |
| dimethyl aminoethyl methacrylate: | 3 mol % |

The water-soluble component of the water-insoluble particles B thus obtained was measured by the following measurement method.

The polymer dispersion was adjusted to have a solid concentration of 10%. 5 ml of the 10% polymer dispersion liquid was added to an Amicon Ultra-15 centrifugal dialysis tube (molecular cut off (Mw) of 100000), made by Millipore Inc., and a centrifuging process was carried out for 40 minutes at 10° C. and a centrifugal acceleration of 4000 G, using an SRX-201 compact high-speed cooled centrifuge device made by Tomi Seiko Co., Ltd. The filtered liquid was collected.

The solid content of the liquid collected by ultra-filtration was measured. The measurement method used involved weighing 500 to 600 mg of the liquid collected through ultra-filtration, into an aluminium cup having a diameter of 1.5 cm, and then heating for 30 min at 120° C. under atmospheric pressure in a vacuum drying apparatus. Subsequently, the liquid was left for 2 hours at 120° C. under reduced pressure (degree of vacuum: 0.1 MPa or lower), and the solid content was then measured.

The measured value of the solid content was multiplied by ten to give the amount of water-soluble polymer component when the solid content of the polymer was 100%. The results are shown in Table 5 of FIG. 9.

Preparation of Self-Dispersing Polymer A-2

Apart from changing the composition of the monomers as described below, a self-dispersing polymer (A-02) was synthesized by a similar method to the self-dispersing polymer (A-01).

| (Composition) | |
|---|---|
| methyl methacrylate: | 46 mol % |
| ethyl acrylate: | 45 mol % |
| methacrylic acid: | 7 mol % |
| dimethyl aminoethyl methacrylate: | 4 mol % |

Preparation of Self-Dispersing Polymer A-3

Apart from the fact that the amount of triethyl amine was changed from 9.87 g to 9.62 g, the self-dispersing polymer (A-03) was synthesized by a similar method to the self-dispersing polymer (A-02).

Preparation of Self-Dispersing Polymer A-4

Apart from changing the composition of the monomers as described below, a self-dispersing polymer (A-04) was synthesized by a similar method to the self-dispersing polymer (A-01).

| (Composition) | |
|---|---|
| methyl methacrylate: | 48 mol % |
| ethyl acrylate: | 45 mol % |
| methacrylic acid: | 5 mol % |
| dimethyl aminoethyl methacrylate: | 2 mol % |

The particle size and the amount of the water-soluble component of the self-dispersing polymers A-01 to A-04 obtained as described above are shown in FIG. 9 (Table 5).

Preparation of Cyan Inks C1-11 to C1-14

Cyan inks C1-11 to C1-14 were prepared by a similar method to the preparation of the cyan ink C1-1, with the exception that the self-dispersing polymers A-01 to A-04 were used respectively instead of LX-07, as the water-insoluble particles B.

Ejection Evaluation 16 lines (120 mm long) each of which is constituted of aligned dots were printed under the conditions described below. Thereupon, the distance between the lines at a position 50 mm from the start of droplet ejection on the print sample was measured using a DA-6000 dot analyser made by Oji Measurement Instruments, Co., Ltd. The standard deviation of the measured distance between the lines was calculated as the ejection displacement, and using this as an indicator of the ejection direction, the ejection direction characteristics were evaluated in accordance with the following evaluation criteria. The corresponding results are shown in FIG. 10 (Table 6).

(Print Conditions)

| | |
|---|---|
| Printer: | DMP-2831 made by Dimatix Inc. |
| Ink volume: | 10 pl |
| Image resolution: | 100 dpi in nozzle arrangement direction |
| | 3200 dpi in conveyance direction |
| Ejection frequency: | 24 kHz |
| Recording medium: | Kassai Photofinish Pro, made by FUJIFILM Corp. |

(Assessment Criteria)

A: equal to or greater than 3 µm and less than 4 µm (no non-uniformity at all observed with naked eye)

B: equal to or greater than 4 µm and less than 5 µm (slight non-uniformity observed with naked eye)

C: 5 µm or greater (non-uniformity clearly visible with naked eye)

From the results shown in FIG. 10 (Table 6), the ejection displacement was not large and the ejection direction characteristics were good in cases of the ink compositions (i.e., the ink C1-11, the ink C1-13 and the ink C1-14) according to the present invention.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An ink composition comprising:
   first particles which are insoluble and dispersed in an aqueous dispersion medium, a polarity of the first particles being one of positive and negative; and
   second particles which are insoluble and dispersed in the aqueous dispersion medium, the second particles including both a cationic group and an anionic group, the second particles having a zeta potential that changes along with a change in pH of the aqueous dispersion medium, percentage of a water-soluble component in the second particles being not higher than 5% by mass.

2. The ink composition as defined in claim 1, wherein at least one of the first particles and the second particles includes a coloring material.

3. The ink composition as defined in claim 1, wherein:
   the zeta potential of the second particles is within a range of −90 mV through 0 mV when the pH of the aqueous dispersion medium is 8; and
   the zeta potential of the second particles is within a range of 0 mV through 90 mV when the pH of the aqueous dispersion medium is 4.

4. The ink composition as defined in claim 1, wherein:
   before the change in the pH of the aqueous dispersion medium, a polarity of the second particles is the same as the polarity of the first particles; and
   due to the change in the pH of the aqueous dispersion medium, the polarity of the second particles is inverted to be opposite to the polarity of the first particles.

5. The ink composition as defined in claim 1, wherein a molar ratio of the anionic group to the cationic group in the second particles is within a range of 80:20 through 20:80.

6. The ink composition as defined in claim 1, wherein the second particles are formed of a polymer that is constituted of a first repeating unit derived from a nonionic monomer, a second repeating unit derived from an anionic monomer and a third repeating unit derived from a cationic monomer, a molar ratio among the first to third repeating units being 1:m:n.

7. The ink composition as defined in claim 1, wherein the second particles have surfaces coated with a polymer that is constituted of a first repeating unit derived from a nonionic monomer, a second repeating unit derived from an anionic monomer and a third repeating unit derived from a cationic monomer, a molar ratio among the first to third repeating units being 1:m:n.

8. The ink composition as defined in claim 1, wherein the second particles are formed of a self-dispersing polymer.

9. The ink composition as defined in claim 1, wherein the second particles are formed of a polymer which is synthesized in an organic solvent and dispersed in the aqueous dispersion medium that is water, the anionic group of the second particles being partially or wholly neutralized.

10. The ink composition as defined in claim 1, the percentage of the water-soluble component in the second particles being not higher than 3% by mass.

11. The ink composition as defined in claim 1, wherein a difference between an average particle size of the first particles and an average particle size of the second particles is not less than 20 nm.

12. The ink composition as defined in claim 1, wherein:
   the first particles have an average particle size of 10 nm through 200 nm; and
   the second particles have an average particle size of 10 nm through 200 nm.

13. An ink set comprising:
   the ink composition as defined in claim 1; and
   a treatment liquid which causes the change in the pH of the aqueous dispersion medium.

14. An inkjet recording method comprising the steps of:
   applying the treatment liquid of the ink set as defined in claim 13 on a recording medium; and
   then applying the ink composition of the ink set as defined in claim 13 on the treatment liquid that has been applied on the recording medium, the treatment liquid on the recording medium mixing with the applied ink composition and causing the change in the pH of the aqueous dispersion medium, the first and second particles in the applied ink composition aggregating with each other due to the change in the pH of the aqueous dispersion medium.

15. The inkjet recording method as defined in claim 14, further comprising the step of removing a solvent of the ink composition and the treatment liquid on the recording medium after the step of applying the ink composition.

16. An inkjet recording method comprising the steps of:
   applying the treatment liquid of the ink set as defined in claim 13 on an intermediate transfer body;
   then applying the ink composition of the ink set as defined in claim 13 on the treatment liquid that has been applied on the intermediate transfer body, the treatment liquid on the intermediate transfer body mixing with the applied ink composition and causing the change in the pH of the aqueous dispersion medium, the first and second particles in the applied ink composition aggregating with each other due to the change in the pH of the aqueous dispersion medium so that an image is formed on the intermediate transfer body;

then removing a solvent of the ink composition and the treatment liquid on the intermediate transfer body; and then transferring the image on the intermediate transfer body to a recording medium.

* * * * *

UNITED STATES PATENT AND TRADEMARK OFFICE
CERTIFICATE OF CORRECTION

| | | |
|---|---|---|
| PATENT NO. | : 7,951,854 B2 | Page 1 of 1 |
| APPLICATION NO. | : 12/132792 | |
| DATED | : May 31, 2011 | |
| INVENTOR(S) | : Terukazu Yanagi et al. | |

It is certified that error appears in the above-identified patent and that said Letters Patent is hereby corrected as shown below:

Cover page, after section (65), please insert the following.

--(30) Foreign Application Priority Data
June 8, 2007 (JP)........2007-153216
Feb. 15, 2008 (JP).......2008-034840--

Signed and Sealed this
Fifth Day of July, 2011

David J. Kappos
*Director of the United States Patent and Trademark Office*